US012776864B2

(12) United States Patent
Zeng et al.

(10) Patent No.: US 12,776,864 B2
(45) Date of Patent: Oct. 27, 2026

(54) CODEBOOK FEEDBACK METHOD AND APPARATUS, DEVICE, AND COMPUTER STORAGE MEDIUM

(71) Applicant: VIVO MOBILE COMMUNICATION CO., LTD., Guangdong (CN)

(72) Inventors: Chaojun Zeng, Guangdong (CN); Na Li, Guangdong (CN); Lihui Wang, Guangdong (CN); Xueming Pan, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 291 days.

(21) Appl. No.: 18/420,477

(22) Filed: Jan. 23, 2024

(65) Prior Publication Data

US 2024/0204917 A1 Jun. 20, 2024

Related U.S. Application Data

(63) Continuation of application No. PCT/CN2022/108264, filed on Jul. 27, 2022.

(30) Foreign Application Priority Data

Jul. 30, 2021 (CN) ........................ 202110875526.4

(51) Int. Cl.
*H04L 5/00* (2006.01)
*H04B 7/0456* (2017.01)
(Continued)

(52) U.S. Cl.
CPC ......... *H04L 1/1812* (2013.01); *H04B 7/0456* (2013.01); *H04W 72/1268* (2013.01); *H04W 72/232* (2023.01); *H04W 72/566* (2023.01)

(58) Field of Classification Search
None
See application file for complete search history.

(56) References Cited

U.S. PATENT DOCUMENTS 11,844,103 B2 * 12/2023 Khoshnevisan ...... H04W 72/56
11,984,992 B2 * 5/2024 Wang .................... H04L 1/1854
(Continued)

FOREIGN PATENT DOCUMENTS

CN 111314040 A 6/2020
WO 2021091251 A1 5/2021
WO 2022024033 A1 2/2022

OTHER PUBLICATIONS

Extended European Search Report for Application No. 22848582.7, dated Jul. 26, 2024.

(Continued)

*Primary Examiner* — Sithu Ko
(74) *Attorney, Agent, or Firm* — Foley & Lardner LLP

(57) ABSTRACT

A codebook feedback method and apparatus, a device, and a computer storage medium. The method includes: determining, by a terminal, a target codebook for feedback based on one or more type 3 codebooks, or based on one or more type 3 codebooks and other HARQ-ACK codebook(s) that need to be fed back, where the one or more type 3 codebooks need to be fed back by the terminal in a single time unit as triggered by a network side, or the one or more type 3 codebooks and other HARQ-ACK codebook(s) need to be fed back by the terminal in a single time unit as triggered by the network side.

14 Claims, 5 Drawing Sheets

(51) Int. Cl.

| | |
|---|---|
| ***H04L 1/1812*** | (2023.01) |
| ***H04W 4/06*** | (2009.01) |
| ***H04W 72/1268*** | (2023.01) |
| ***H04W 72/232*** | (2023.01) |
| ***H04W 72/566*** | (2023.01) |

(56) References Cited

U.S. PATENT DOCUMENTS

| | | | | |
|---|---|---|---|---|
| 12,192,857 | B2 * | 1/2025 | Li | H04L 1/1854 |
| 2020/0314815 | A1 | 10/2020 | Kim et al. | |
| 2021/0168776 | A1 * | 6/2021 | Li | H04L 1/1812 |
| 2022/0060288 | A1 * | 2/2022 | Sun | H04L 1/1819 |
| 2022/0232592 | A1 * | 7/2022 | Dimou | H04L 1/1685 |
| 2022/0303064 | A1 * | 9/2022 | Yang | H04L 1/1896 |
| 2023/0074723 | A1 * | 3/2023 | Alfarhan | H04L 1/1614 |
| 2023/0155746 | A1 * | 5/2023 | Ouchi | H04W 72/232 370/329 |
| 2023/0261840 | A1 * | 8/2023 | Wong | H04L 1/1812 370/329 |
| 2023/0283415 | A1 * | 9/2023 | Blankenship | H04L 1/1854 370/329 |
| 2024/0056776 | A1 * | 2/2024 | Elmali | H04L 5/0055 |

OTHER PUBLICATIONS

Nokia, Nokia Shanghai Bell "Remaining issues on NR-U HARQ scheduling and feedback" 3GPP TSG RAN WG1 Meeting #100e, e-Meeting, Feb. 2020, R1-2000503, 12 Pages.

Samsung "HARO enhancements for NR-U" 3GPP TSG RAN WG1 #101, e-Meeting, May 2020, R1-2003862, 5 Pages.

Apple Inc. "Views on URLLC HARQ feedback enhancements" 3GPP TSG-RAN WG1 Meeting #105-e, e-Meeting, May 2021, R1-2105097, 7 Pages.

Panasonic "Discussion on UE feedback enhancements for HARO-ACK" 3GPP TSG RAN WG1 #105-e, e-Meeting, May 2021, R1-2105188, 3 Pages.

International Search Report and Written Opinion for Application No. PCT /CN2022/108264, dated Sep. 21, 2022, 7 Pages.

Moderator (Huawei) "Feature lead summary#1 on 101 e NR unlic NRU HARQ 02 (Type 3 HARQ ACK codebook)" 3GPP TSG RAN WG1 Meeting #101-e, e-Meeting, May 2020, R1 2004745, 24 Pages.

* cited by examiner

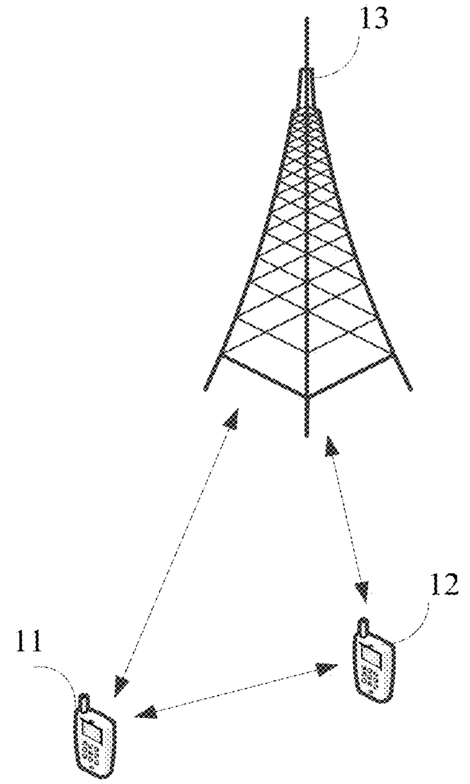

FIG. 1

201

A terminal determines a target codebook for feedback according to one or more Type 3 codebooks, or according to one or more Type 3 codebooks and other HARQ-ACK codebooks that need to be fed back; where the one or more Type 3 codebooks need to fed back by the terminal within a single time unit as triggered by a network side, or the one or more Type 3 codebooks and other HARQ-ACK codebooks need to fed back by the terminal within a single time unit as triggered by the network side

FIG. 2

CODEBOOK FEEDBACK METHOD AND APPARATUS, DEVICE, AND COMPUTER STORAGE MEDIUM

CROSS-REFERENCE TO RELATED APPLICATIONS

This application is a continuation of International Application No. PCT/CN2022/108264 filed on Jul. 27, 2022, which claims priority of Chinese Patent Application No. 202110875526.4 filed on Jul. 30, 2021, which are incorporated herein by reference in their entireties.

TECHNICAL FIELD

The present application belongs to the field of communication technologies, and specifically relates to a codebook feedback method and apparatus, a device, and a computer storage medium.

BACKGROUND

When multiple enhanced Type-3 codebooks (Type-3 codebook) with different contents/ranges are triggered in a single slot (Slot)/sub-slot (Sub-slot), or when a Type-3 codebook is triggered in a single slot or sub-slot, and other hybrid automatic repeat request acknowledgment (Hybrid automatic repeat request acknowledgement, HARQ-ACK) codebook(s) (HARQ-ACK information corresponding to the other HARQ-ACK codebook(s) may not be included in the triggered enhanced Type-3 codebook) needs to be fed back, there is currently no corresponding solution for how a terminal (for example, user equipment (User Equipment, UE)) feeds back related HARQ-ACK.

SUMMARY

Embodiments of the present application provide a codebook feedback method and apparatus, a device, and a computer storage medium, which can solve the problem of how a terminal determines a codebook that needs to be fed back.

According to a first aspect, a codebook feedback method is provided, including:

- determining, by a terminal, a target codebook for feedback based on one or more type 3 codebooks, or based on one or more type 3 codebooks and other hybrid automatic repeat request acknowledgement HARQ-ACK codebooks that need to be fed back;
- where the one or more type 3 codebooks need to be fed back by the terminal in a single time unit as triggered by a network side, or the one or more type 3 codebooks and other HARQ-ACK codebook(s) need to be fed back by the terminal in a single time unit as triggered by the network side.

According to a second aspect, a codebook feedback method is provided, including:

- triggering, by a network side device, a terminal to feed back one or more type 3 codebooks in a single time unit, or triggering, by the network side device, the terminal to feed back one or more type 3 codebooks and other HARQ-ACK codebook(s) in a single time unit; and
- obtaining, by the network side device, a target codebook fed back by the terminal, where the target codebook is determined by the terminal according to the one or more type 3 codebooks, or according to the one or more type 3 codebooks and other HARQ-ACK codebook(s).

According to a third aspect, a codebook feedback apparatus is provided, including:

- a first determination module, configured to determine a target codebook for feedback based on one or more type 3 codebooks, or based on one or more type 3 codebooks and other HARQ-ACK codebook(s) that need to be fed back;
- where the one or more type 3 codebooks need to be fed back by the terminal in a single time unit as triggered by a network side, or the one or more type 3 codebooks and other HARQ-ACK codebook(s) need to be fed back by the terminal in a single time unit as triggered by the network side.

According to a fourth aspect, a codebook feedback apparatus is provided, including:

- a triggering module, configured to trigger a terminal to feed back one or more type 3 codebooks in a single time unit, or trigger the terminal to feed back one or more type 3 codebooks and other HARQ-ACK codebook(s) in a single time unit; and
- an obtaining module, configured to obtain a target codebook fed back by the terminal, where the target codebook is determined by the terminal according to the one or more type 3 codebooks, or according to the one or more type 3 codebooks and other HARQ-ACK codebook(s).

According to a fifth aspect, a terminal is provided, including a processor, a memory, and a program stored in the memory and executable on the processor, where when the program is executed by the processor, steps of the method according to the first aspect are implemented.

According to a sixth aspect, a network side device is provided, where the network side device includes a processor, a memory, and a program stored in the memory and executable on the processor, and when the program is executed by the processor, steps of the method according to the second aspect are implemented.

According to a seventh aspect, a readable storage medium is provided, where the readable storage medium stores a program or an instruction, and when the program or the instruction is executed by a processor, steps of the method according to the first aspect or the second aspect are implemented.

According to an eighth aspect, a computer program/program product is provided, the computer program/program product is stored in a storage medium, and the computer program/program product is executed by at least one processor to implement the steps of the method described in the first aspect or the second aspect.

According to a ninth aspect, a chip is provided, the chip includes a processor and a communication interface, the communication interface is coupled to the processor, and the processor is used to run programs or instructions, so as to implement the method according to the first aspect or the second aspect.

In the embodiments of the present application, when one or more type 3 codebooks are triggered on the network side in a single time unit, or one or more type 3 codebooks are triggered on the network side in a single time unit, and other HARQ-ACK codebook(s) need to be fed back, the terminal can determine and feed back the target codebook according to one or more type 3 codebooks, or according to one or more type 3 codebooks and other HARQ-ACK codebook(s)

that need to be fed back, thereby ensuring HARQ-ACK feedback performance and improving the reliability of the communication system.

BRIEF DESCRIPTION OF DRAWINGS

FIG. 1 is a schematic diagram of a wireless communication system to which an embodiment of this application is applicable;

FIG. 2 is a flowchart 1 of a codebook feedback method provided by an embodiment of the present application;

DETAILED DESCRIPTION

Figure 3:
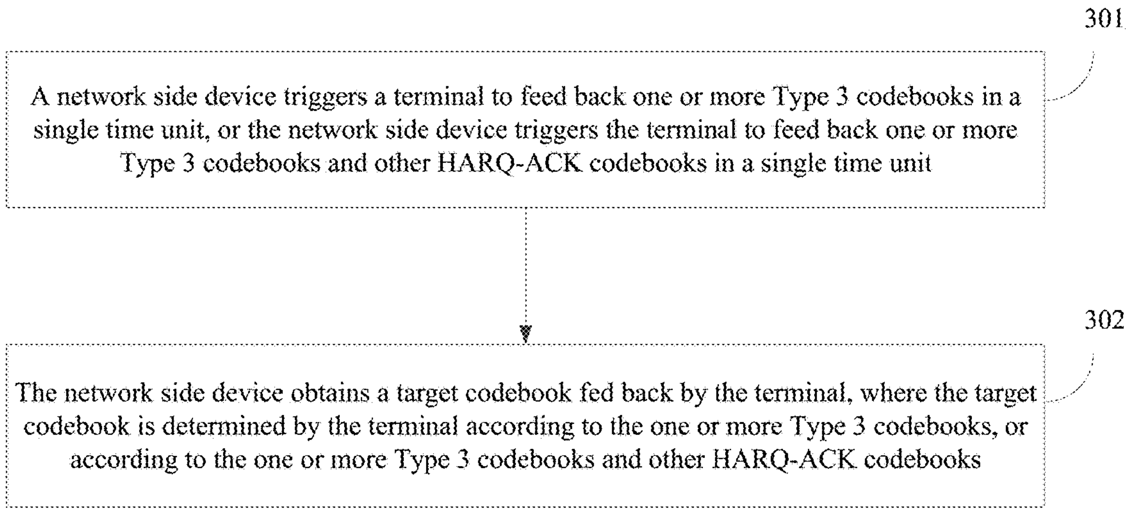
FIG. 3 is a flowchart 2 of a codebook feedback method provided by an embodiment of the present application.

The following clearly describes technical solutions in embodiments of this application with reference to accompanying drawings in the embodiments of this application. Apparently, the described embodiments are some but not all of the embodiments of this application. All other embodiments obtained by persons of ordinary skill in the art based on the embodiments of the disclosure shall fall within the scope of protection of the disclosure.

Terms "first", "second", and the like in the specification and claims of this application are used to distinguish between similar objects, instead of describing a specific sequence or order. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, "and" in the specification and claims represents at least one of connected objects. Symbol "/" generally represents an "or" relationship between associated objects.

It should be noted that the technology described in the embodiments of this application is not limited to a Long Term Evolution (Long Term Evolution, LTE)/LTE-Advanced (LTE-Advanced, LTE-A) system, and may also be used in other wireless communications systems such as Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), Single-carrier Frequency-Division Multiple Access (Single-carrier Frequency-Division Multiple Access, SC-FDMA), and another system. The terms "system" and "network" in the embodiments of this application are often used interchangeably, and the described technology can be used not only for the systems and radio technologies mentioned above, but also for other systems and radio technologies. The following descriptions describe a new radio (New Radio, NR) system for example purposes, and NR terms are used in most of the following descriptions, but these technologies can also be applied to an application other than an NR system application, for example, a 6th generation (6th Generation, 6G) communication system.

In order to facilitate the understanding of the embodiments of this application, the following technical points are introduced first:

1. Release 16 (Release 16, Rel-16) Type-3 codebook:

In the New Radio-Unlicensed (New Radio-Unlicensed, NR-U) Rel-16 of the unlicensed frequency band, in order to ensure that the UE and the network side have a completely consistent understanding of the number of HARQ-ACK Codebook bits and HARQ-ACK information of all configured HARQ processes is fed back, a Type-3 codebook is introduced, and HARQ-ACK information is fed back for each configured codeword of all configured HARQ processes on all carriers currently configured for the UE. In order to ensure that the UE and the base station (Evolved Node B, eNB) have a consistent understanding of physical downlink shared channel (Physical Downlink Shared Channel, PDSCH) transmission corresponding to a fed-back HARQ-ACK bit, and avoid the problem of understanding ambiguity caused by missed detection of physical downlink control information (Downlink Control Information, DCI), the Type-3 codebook can further include a new data indicator (New Data Indicator, NDI) corresponding to each codeword (if a codeword of a certain HARQ process has not been scheduled, it can be assumed that its corresponding NDI=0), and whether the indicator is included can be configured by the network side through high-layer parameters.

2. Release 17 (Release 17, Rel-17) HARQ-ACK retransmission

In the ultra-reliable and low latency communications (Ultra-reliable and Low Latency Communications, URLLC) Rel-17 research, in order to ensure the performance of HARQ-ACK feedback, the issue of retransmission of canceled HARQ-ACK (Retransmission of Cancelled HARQ-ACK) is proposed and a corresponding solution is studied. HARQ-ACKs that require retransmission in this issue include:

(1) Based on two physical layer priorities (Intra-UE prioritization) configured for single UE, HARQ-ACK carried in uplink transmission with a lower physical layer priority (PUCCH/PUSCH) deleted by uplink transmission with a higher physical layer priority (Physical Uplink Shared Channel (Physical Uplink Control Channel, PUCCH)/Physical Uplink Shared Channel (Physical Uplink Shared Channel, PUSCH)).

(2) Based on inter-UE priority processing (Inter-UE cancellation), HARQ-ACK carried in uplink transmission (such as PUSCH) deleted by uplink cancellation indication (UL Cancellation indication, UCI).

(3) Semi-persistent scheduling (Semi-Persistent Scheduling, SPS) HARQ-ACK that is discarded due to conflict with time division duplexing (Time Division Duplexing, TDD) pattern (pattern) (semi-static (semi-static)

downlink symbol (DL symbol)/Synchronization Signal and PBCH block (Synchronization Signal and PBCH block, SSB)/control resource set #0 (control-resource set #0, CORESET #0)) (which can also be recovered through the SPS HARQ-ACK deferral (deferral) mechanism).

In the RANI #105-e meeting, after a long discussion, a compromise is reached among various manufacturers and the following working assumption is formed, and retransmission of HARQ-ACK based on optimized Type-3 codebook and One-shot triggering is also supported.

For Type-3 codebook optimization, currently the main consideration is to trigger HARQ-ACK feedback for only some HARQ processes (rather than for all configured HARQ processes on all configured carriers in the Rel-16 Type-3 codebook) as needed, to reduce the codebook size and avoid the overhead caused by unnecessary HARQ-ACK feedback. For example, the network side configures a state (State) list. Each state in the list corresponds to/indicates a different/unique HARQ process range (which can further indicate a serving cell (Serving cell) range), and also corresponds to a Type-3 codebook (when the HARQ process range is different from the Rel-16 Type-3 codebook, it can be called an enhanced Type-3 codebook). This Type-3 codebook contains HARQ-ACK corresponding to each HARQ process in a HARQ process set indicated by a corresponding state, and its codebook construction can follow all/part of rules of Rel-16 Type-3 codebook construction (for example, the codebook is organized based on the HARQ process). The network can trigger a corresponding Type-3 codebook by indicating a state index (State index) corresponding to a certain state in the state list in the triggering DCI. In addition, the HARQ-ACK set/range corresponding to the triggered Type-3 codebook can also be explicitly indicated by the indication field in the triggering DCI.

Referring to FIG. 1, FIG. 2 is a block diagram of a wireless communications system to which embodiments of the present application can be applied. The wireless communication system includes a terminal 11, a terminal 12 and a network side device 13. The terminal can also be called a terminal device or UE. The terminal may be a mobile phone, a tablet personal computer (Tablet Personal Computer), a laptop computer (Laptop Computer) or a notebook computer, a personal digital Assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device) or a vehicle-mounted device (VUE), a pedestrian terminal (PUE), and other terminal side devices. The wearable device includes: smart watches, bracelets, earphones, glasses, etc. It should be noted that the embodiment of the present application does not limit the specific types of the terminal 11 and the terminal 12.

The network side device 13 may be a base station or a core network. The base station may be referred to as a node B, an evolved node B, an access point, a base transceiver station (BTS), a radio base station, a radio transceiver, a basic service set (BSS), an extended service set (ESS), a node B, an evolved node B (gNB), a home node B, a home evolved node B, a WLAN access point, a WiFi node, a transmitting receiving point (TRP), a wireless access network node, or other appropriate terms in the art. As long as a same technical effect is achieved, the base station is not limited to a specified technical term. It should be noted that, in embodiments of the present application, only a base station in the NR system is used as an example, but a specific type of the base station is not limited.

Referring to FIG. 2, an embodiment of the present application provides a codebook feedback method. Specific steps include: step 201.

Step 201: A terminal determines a target codebook for feedback based on one or more type 3 codebooks, or based on one or more type 3 codebooks and other HARQ-ACK codebook(s) that need to be fed back.

The one or more type 3 codebooks need to be fed back by the terminal in a single time unit as triggered by a network side, or the one or more type 3 codebooks and other HARQ-ACK codebook(s) that need to be fed back need to be fed back by the terminal in a single time unit as triggered by the network side.

It can be understood that the time unit may be a slot (slot) or a sub-slot (sub-slot), or other time units of predefined duration. The target codebook can also be described as a codebook to be transmitted or a codebook to be fed back.

Type 3 codebooks in this specification may include: basic type 3 codebooks and/or enhanced type 3 codebooks. The basic type 3 codebook refers to feeding back HARQ-ACK information for each configured codeword of all configured HARQ processes on all carriers currently configured for the UE. The enhanced type 3 codebook refers to feeding back HARQ-ACK information for codewords of a part of HARQ processes currently configured for the UE.

Other HARQ-ACK codebook(s) in this specification may include: the HARQ-ACK codebook for initial transmission and/or the HARQ-ACK codebook for retransmission.

In an implementation of this application, the multiple type 3 codebooks correspond to a same physical layer priority. For specific implementation, refer to example 1 (case 1) introduced below.

In another implementation of the present application, the one or more type 3 codebooks and other HARQ-ACK codebook(s) that need to be fed back correspond to a same physical layer priority. For specific implementation, refer to example 2 introduced below (case 2).

In yet another implementation of the present application, at least one of the one or more type 3 codebooks and/or the other HARQ-ACK codebook(s) that need to be fed back corresponds to a different physical layer priority from that/those of other codebooks. For specific implementation, refer to example 3 introduced below (case3).

In an implementation of the present application, the step of determining a target codebook for feedback based on one or more type 3 codebooks and other HARQ-ACK codebook(s) that need to be fed back includes the following method 1 or method 2:

Method 1: The terminal determines a target HARQ-ACK for feedback according to a first codebook determination method, the one or more type 3 codebooks, and the other HARQ-ACK codebook(s) that need to be fed back.

The first codebook determination method may include codebook feedback methods 2-4 and codebook feedback methods 2-5 in example 2 introduced below.

Method 2: the terminal determines a type of the target HARQ-ACK for feedback according to a second codebook determination method;

- in a case that the type of the target HARQ-ACK is a type 3 codebook, determine the target codebook for feedback based on the one or more type 3 codebooks; and
- in a case that the type of the target HARQ-ACK is a type corresponding to the other HARQ-ACK codebook(s), determine the target codebook for feedback based on the other HARQ-ACK codebook(s).

The second codebook determination method may include: codebook feedback method 2-1, codebook feedback method 2-2 and codebook feedback method 2-3 in example 2 introduced below.

In an implementation of the present application, the step of determining, by a terminal, a target codebook for feedback based on one or more type 3 codebooks includes the following (1) or (2):

(1): In a case that the network side triggers the terminal to feed back one type 3 codebook in a single time unit, the terminal determines to feed back the type 3 codebook.

That is, when only a single type 3 codebook is triggered, the single type 3 codebook is directly fed back.

(2): In a case that the network side triggers the terminal to feed back multiple type 3 codebooks in a single time unit, the terminal determines the target codebook for feedback according to a third codebook determination method.

The third codebook determination method may include: codebook feedback method 1-1, codebook feedback method 1-2, codebook feedback method 1-3, codebook feedback method 1-4, and codebook feedback methods 1-5 in example 1 introduced below.

In an implementation manner of the present application, the third codebook determination method includes any one of the following (1) to (5):

(1) Select one type 3 codebook from the multiple type 3 codebooks.

It can be understood that one or more type 3 codebooks fed back by the terminal as triggered by the network side can be described as triggered one or more type 3 codebooks, and other HARQ-ACK codebook(s) fed back by the terminal as triggered by the network side can be described as triggered other HARQ-ACK codebook(s).

For related descriptions, refer to codebook feedback method 1-1 in example 1.

(2) Construct a new (corresponding) type 3 codebook according to the union of HARQ process (process) sets corresponding to the multiple type 3 codebooks.

For related descriptions, refer to codebook feedback method 1-2 in example 1.

The union of the HARQ process sets can be understood as that each HARQ process appears at most once in the union. Based on this union, the (new) type 3 codebook to be transmitted can be constructed according to the construction principle of the type 3 codebook, for example, a HARQ-ACK bit order can be constructed based on a cycle structure of a serving cell (Serving cell) or HARQ process or transport block (Transport Block, TB) index (index). The serving cell and HARQ processes involved in the traversal only cover HARQ processes in the union.

When one or more pieces of triggered DCIs are not directed, the terminal and the network may have inconsistent understandings of the number of triggered type 3 codebooks, resulting in a misunderstanding of information/content of the (new) type 3 codebooks that actually need to be transmitted and a corresponding number of bits.

(3) Cascade the multiple type 3 codebooks in a first order in a head-to-tail manner to obtain a composite codebook.

It can be understood that a single HARQ process may correspond to multiple HARQ-ACK bits in the composite codebook, and therefore there are redundant HARQ-ACK bits.

For related descriptions, refer to codebook feedback method 1-3 in example 1.

(4) Determine a first type 3 codebook that meets a first condition.

Optionally, the first type 3 codebook may be configured by the network or specified in the protocol. The first type 3 codebook may be a basic type 3 codebook or an enhanced type 3 codebook.

When the network side configures a state (state) list for the terminal, each state in the state list can be traversed to find a type 3 codebook that satisfies the first condition and corresponds to a certain state.

For related descriptions, refer to codebook feedback method 1-4 in example 1.

(5) Determine to feed back a Rel-16 type 3 codebook.

For related descriptions, refer to codebook feedback method 1-5 in example 1.

It can be understood that as long as the network side triggers the terminal to feed back multiple type 3 codebooks in a single time unit, the terminal can directly feed back the Rel-16 type 3 codebook.

In an embodiment of the present application, the first condition includes one of the following (1) to (4):

(1) The first type 3 codebook meets a first requirement, and the first type 3 codebook has the smallest number of bits among all type 3 codebooks that meet the first requirement in various types of sets of type 3 codebooks, where the first requirement is: HARQ-ACKs corresponding to all HARQ processes corresponding to any one of the triggered multiple type 3 codebooks.

The various types of sets of type 3 codebooks can be configured by the network side or specified in the protocol.

(2) The first type 3 codebook meets a second requirement, and the first type 3 codebook has the smallest number of bits among all type 3 codebooks that meet the second requirement, where the second requirement is: HARQ-ACKs corresponding to all HARQ processes corresponding to the triggered one or more type 3 codebooks and other HARQ-ACK codebook(s).

(3) The first type 3 codebook meets a third requirement, and the third requirement is: a HARQ process number difference between all HARQ processes corresponding to the type 3 codebooks in various types of sets of type 3 codebooks and a first union is the smallest, and the first union is a union of all HARQ processes corresponding to the triggered multiple type 3 codebooks.

(4) The first type 3 codebook meets a fourth requirement, and the fourth requirement is: a HARQ process number difference between all HARQ processes corresponding to the type 3 codebooks in various types of sets of type 3 codebooks and a second union is the smallest, and the second union is a union of all HARQ processes corresponding to the triggered one or more type 3 codebooks and the other HARQ-ACK codebook(s).

In an implementation manner of the present application, determining the first type 3 codebook that meets the first condition includes:

in a case that there are multiple type 3 codebooks that satisfy the first condition, selecting one type 3 codebook from the multiple type 3 codebooks as the first type 3 codebook.

When there is more than one type 3 codebook that meets the first condition, a single type 3 code can be selected from the more than one type 3 codebook based on predefined rules. For example, a type 3 codebook with the largest codebook index (Codebook index) or state index (State index) may be selected, or a type 3 codebook with the smallest codebook index or state index may be selected.

In an implementation manner of the present application, selecting one type 3 codebook from the triggered multiple type 3 codebooks includes any one of the following (1) to (11):

(1) In a case that the multiple type 3 codebooks include a (single) basic type 3 codebook, select the basic type 3 codebook.

For related descriptions, refer to codebook feedback method 1-1-1 in example 1.

(2) Select a type 3 codebook with the earliest trigger time from the multiple type 3 codebooks.

The triggering time may be a time when the network side sends information or signaling that triggers the terminal to feed back the codebook.

(3) Select a type 3 codebook with the latest trigger time from the multiple type 3 codebooks.

For relevant descriptions of the above (2) and (3), refer to the codebook feedback method 1-1-2 in example 1.

When the transmission of the type 3 codebook is triggered by DCI, the trigger time here can be determined using a DCI delivery time. A DCI time order can follow the rules in Rel-15 or Rel-16, for example, based on an order of PDCCH monitoring (monitoring) occasions (occasions) (start time/end time) for DCI delivery. When times (such as start time or end time) of PDCCH monitoring occasions for two DCI deliveries are equal, arrangement may be further made in ascending order based on indexes of downlink serving cells (DL Serving cell).

The type 3 codebook with the earliest trigger time here can be understood as a type 3 codebook triggered by the first triggering DCI among multiple pieces of triggering DCI (each triggering DCI corresponds to a single type 3 codebook).

The type 3 codebook with the latest trigger time here can be understood as a type 3 codebook triggered by the last triggering DCI among multiple pieces of triggering DCI (each triggering DCI corresponds to a single type 3 codebook).

When multiple pieces of triggering DCI trigger a single Type-3 codebook, for this type 3 codebook, only the earliest/latest single triggering DCI or the first/last triggering DCI among these pieces of triggering DCI is considered. That is, when selecting the type 3 codebook with the earliest/latest triggering time from the multiple type 3 codebooks, each triggered type 3 codebook only corresponds to a single triggering DCI selected according to the aforementioned rules, and then a single type 3 codebook is selected based on triggering DCI corresponding to each type 3 codebook.

(4) Select a type 3 codebook with the earliest or latest start time of a corresponding physical uplink control channel resource from the multiple type 3 codebooks.

(5) Select a type 3 codebook with the earliest or latest end time of a corresponding physical uplink control channel resource from the multiple type 3 codebooks.

For relevant descriptions of the above (4) and (5), refer to the codebook feedback method 1-1-3 in example 1.

(6) Select a type 3 codebook with the smallest identifier or index of a corresponding physical uplink control channel resource from the multiple type 3 codebooks.

(7) Select a type 3 codebook with the largest identifier or index of a corresponding physical uplink control channel resource from the multiple type 3 codebooks.

For relevant descriptions of the above (6) and (7), refer to the codebook feedback method 1-1-4 in example 1.

(8) Select a type 3 codebook with the largest number of corresponding HARQ processes from the multiple type 3 codebooks.

(9) Select a type 3 codebook with the smallest number of corresponding HARQ processes from the multiple type 3 codebooks.

For relevant descriptions of the above (8) and (9), refer to the codebook feedback method 1-1-5 in example 1.

(10) Select a type 3 codebook with the largest codebook index or state index from the triggered multiple type 3 codebooks.

(11) Select a type 3 codebook with the smallest codebook index or state index from the multiple type 3 codebooks.

For relevant descriptions of the above (10) and (11), refer to the codebook feedback method 1-1-6 in example 1.

The codebook index or state index can be configured by the high layer. For example, each enhanced type 3 codebook can correspond to a certain state in the state list configured by the high layer, and by indicating the state index corresponding to this state in the triggering DCI, the corresponding enhanced type 3 codebook can be triggered. The state index can be an index of a certain state in the state list, or can be configured independently for each state.

It should be noted that the codebook index can directly be the state index here, or can be derived based on the state index here, for example, converted based on a predefined formula.

Optionally, the Rel-16 type 3 codebook can also correspond to a certain state in the state list, or the Rel-16 type 3 codebook does not correspond to a certain state in the state list, but its codebook index or state index is specified by the protocol or configured through higher layer signaling.

In an embodiment of the present application, the first order is determined according to any one of the following (1) to (4):

(1) a corresponding time order for triggering downlink control information.

For example, according to the ascending order of the trigger time of the downlink control information, for the time order for triggering the downlink control information, refer to the previous description. For the description of (1), refer to the order 1-1 in example 1.

(2) a time order of physical uplink control channel resources carrying the type 3 codebooks.

An example is ascending order of start times or end times of physical uplink control channel resources. For the description of (2), refer to the order 1-2 in example 1.

(3) a size order of identifiers or indexes of physical uplink control channel resources carrying the type 3 codebook.

An example is ascending order of identifiers or indexes. For the description of (3), refer to the order 1-3 in example 1.

(4) a size order of codebook indexes or state indexes corresponding to the type 3 codebooks.

An example is ascending order of codebook indexes or state indexes. For the description of (4), refer to the order 1-4 in example 1.

Optionally, each triggering downlink control information and the transmission corresponding to the triggered type 3 codebook need to meet timeline (Timeline) requirements for uplink control information (Uplink control information, UCI) multiplexing (multiplexing).

In an implementation manner of the present application, the first codebook determination method includes any one of the following (1) to (2):

(1) Cascade, in a second order in a head-to-tail manner, a part of the one or more type 3 codebooks and other HARQ-ACK codebook(s), to obtain a composite codebook.

That is, the codebooks to be transmitted are cascaded in a head-to-tail manner in the second order to obtain a composite codebook.

Optionally, some codebooks can be selected from one or more type 3 codebooks and other HARQ-ACK codebook(s) that need to be fed back for head-to-tail cascading and transmission, for example, only a type 3 codebook with the largest or smallest codebook index or state index is selected, and is cascaded in a head-to-tail manner with other HARQ-ACK codebook(s) that need to be fed back.

For relevant descriptions of (1), refer to the codebook feedback method 2-4 in example 2.

(2) directly feeding back the basic type 3 codebook.

For relevant descriptions of (2), refer to the codebook feedback method 2-5 in example 2.

In an embodiment of the present application, the second order includes one of the following (1) to (2):

(1) Cascade the other HARQ-ACK codebook(s) after a bit order corresponding to the one or more type 3 codebooks.

(2) Cascade the bit order corresponding to the one or more type 3 codebooks after the other HARQ-ACK codebook(s).

When there is only one type 3 codebook that needs to be transmitted, the type 3 codebook bit order here is the type 3 codebook. When there is more than one type 3 codebook that needs to be transmitted, the type 3 codebook bit order here can be a composite codebook obtained by cascading the more than one type 3 codebook in a head-to-tail manner in a predefined order according to the operation described in codebook feedback method 1-3.

For relevant descriptions of (1) and (2), refer to order 2-1 in example 2.

In an embodiment of the present application, the second order is determined according to any one of the following (1) to (4):

(1) a first time order, where the first time order is an order of trigger times of downlink control information corresponding to the one or more type 3 codebooks, and trigger times of downlink control information corresponding to the other HARQ-ACK codebook(s) that need to be fed back, for example, in ascending order of time.

The time order for triggering DCI can be found in the previous description.

Corresponding (single) triggering DCI of the type 3 codebook is as described above.

For Type-1 codebook (Type-1 codebook), Type-2 codebook (Type-2 codebook), and enhanced Type-2 codebook, the last DCI carrying the corresponding HARQ-ACK can be used as its corresponding (single) triggering DCI.

For an SPS HARQ-ACK codebook (SPS HARQ-ACK only), there is no corresponding triggering DCI. Alternatively, virtual DCI is determined based on the most recently activated/reactivated DCI corresponding to carried SPS HARQ-ACK (when multiple SPS configurations (Config) are involved, SPS HARQ-ACK corresponding to SPS Config with the minimum or maximum index or a predefined value can be considered) and the applied K1.

For the description of (1), refer to the order 2-2 in example 2.

(2) a second time order, where the second time order is an order of times of physical uplink control channel resources carrying the one or more type 3 codebooks, and times of physical uplink control channel resources carrying the other HARQ-ACK codebook(s) that need to be fed back, for example, in ascending order of start times or end times of physical uplink control channel resources.

For the description of (2), refer to the order 2-3 in example 2.

(3) a first size order, where the first size order is a size order of identifiers or indexes of physical uplink control channel resources carrying the one or more type 3 codebooks, and identifiers or indexes of physical uplink control channel resources carrying the other HARQ-ACK codebook(s) that need to be fed back, for example, in ascending order of identifiers or indexes.

For the description of (2), refer to the order 2-4 in example 2.

(4) a second size order, where the second size order is a size order of codebook indexes or state indexes corresponding to the one or more type 3 codebooks and codebook indexes or state indexes corresponding to the other HARQ-ACK codebook(s) that need to be fed back, for example, in ascending order of codebook indexes or state indexes.

For the codebook index or state index corresponding to the type 3 codebook, refer to the previous description.

For other HARQ-ACK codebook(s), corresponding codebook index or state index can be specified by the protocol or configured based on high-layer signaling.

It can be understood that a single HARQ process or PDSCH transmission may correspond to multiple HARQ-ACK bits in the composite codebook, and therefore there are redundant HARQ-ACK bits.

Optionally, when the HARQ-ACK corresponding to a certain HARQ process is already included in other HARQ-ACK codebook(s), reported information including HARQ-ACK, NDI, or the like corresponding to this HARQ process is deleted from one or more cascaded type 3 codebooks.

Optionally, each triggering DCI and the transmission corresponding to the corresponding codebook need to meet the predefined timeline requirement. The timeline requirement here can be the UCI multiplexing timeline requirement defined by Rel-15 or Rel 16, and/or PUCCH overriding (Modification) timeline requirement, and/or other timeline requirements.

For the description of (2), refer to the order 2-5 in example 2.

In an implementation manner of the present application, the second codebook determination method includes any one of the following (1) to (3):

(1) only type 3 codebook(s) are transmitted.

Optionally, when the network side triggers the UE to feed back a single type 3 codebook in the same time unit and other HARQ-ACK codebook(s) need to be fed back, if the triggered single type 3 codebook is not a Rel-16 type 3 codebook (it can be understood that when it is a Rel-16 type 3 codebook, based on the Rel-16 regulation, only the Rel-16 type 3 codebook is transmitted without additional operation), the method similar to the codebook feedback method 1-4 in example 1 can be used to search and determine a Rel-16 type 3 codebook configured by the network or specified by the protocol, so that this type 3 codebook can cover all HARQ processes corresponding to a triggered single type 3 codebook and other HARQ-ACK codebook(s) that need to be fed back, the number of bits is the smallest, and this type 3 codebook is transmitted.

Optionally, HARQ processes covered by the determined type 3 codebook need to be most similar to the union of all HARQ processes corresponding to the triggered single type 3 codebooks and the other HARQ-ACK codebook(s) that need to be fed back, for example, a HARQ process number difference (more than or less than) is the smallest.

Optionally, when there is more than one type 3 codebook that meets the requirement, a single type 3 code can be selected from the more than one type 3 codebook based on predefined rules. For example, the type 3 codebook with the largest or smallest codebook index or state index can be selected. When the network side configures a state list for the UE, each state in the state list can be traversed to find a type 3 codebook that satisfies the requirement and corresponds to a certain state.

When using codebook feedback method 1-4 in example 1, optionally, the determined type 3 codebook can be further expanded so that this type 3 codebook covers triggered multiple type 3 codebooks and all HARQ processes corresponding to other HARQ-ACK codebook(s) that need to be fed back, and the number of bits is the smallest, and this type 3 codebook is transmitted. Other processing is the same or similar to the corresponding processing of codebook feedback method 1-4, and will not be described again here.

It should be noted that when DCI is not detected, HARQ processes that need to be reported in other HARQ-ACK codebook(s) may be understood inconsistently between both sides (the UE cannot know accurately the HARQ process occupied by PDSCH transmission corresponding to DCI not detected, and when using the Type 2 codebook or the enhanced Type 2 codebook, generally the UE can determine missed detection of the DCI), resulting in that the type 3 codebook actually fed back (including the information/content contained in the codebook, and the corresponding number of bits, or the like) is inconsistently understood between both sides.

For relevant descriptions of (1), refer to the codebook feedback method 2-1 in example 2.

(2) only the other HARQ-ACK codebook(s) are fed back.

It is assumed here that the type 3 codebook can further be triggered to retransmit as needed. Under normal circumstances, other HARQ-ACK codebook(s) mainly include the initially transmitted HARQ-ACK; when it is an enhanced dynamic codebook, it may also include retransmitted HARQ-ACK.

For relevant descriptions of (2), refer to the codebook feedback method 2-2 in example 2.

(3) whether to feed back the type 3 codebook(s) or the other HARQ-ACK codebook(s) is determined according to a first rule.

For relevant descriptions of (3), refer to the codebook feedback method 2-3 in example 2.

In an implementation manner of this application, the first rule includes any one of the following (1) to (6):

(1) in a case that the type 3 codebook(s) include all HARQ-ACK information in the other HARQ-ACK codebook(s), only the type 3 codebook(s) are fed back.

For example, when the type 3 codebook is a Rel-16 type 3 codebook, or contains HARQ-ACK information corresponding to all downlink HARQ processes configured in all serving cells currently activated by the UE, assuming that other HARQ-ACK codebook(s) are SPS HARQ-ACK codebooks, the UE can only transmit the type 3 codebook. When UE has not detected the DCI, it may not be able to determine the case of missed detection of the DCI or the HARQ process scheduled by the DCI not detected. Therefore, in some cases (for example, when the type 3 codebook only involves a part of the HARQ processes for a certain DL serving cell), it may not accurately determine the above inclusion relationship.

For the relevant description of (1) above, please refer to rule 1 in example 2.

(2) determining is performed based on triggering times of the type 3 codebook(s) and/or the other HARQ-ACK codebook(s).

Optionally, the triggering time may be determined based on the order for triggering DCI, and the triggering DCI refers to DCI used by the network side to trigger the terminal to feed back the type 3 codebook and/or other HARQ-ACK codebook(s).

For the triggering time of the type 3 codebook/order of triggering DCI, refer to the previous description.

For corresponding DCI of other HARQ-ACK codebook(s) (such as Type-1 codebook (Type-1 codebook), Type-2 codebook, or enhanced Type-2 codebook), refer to or follow corresponding description of the triggering time of the type 3 codebook or the order of triggering DCI.

When the corresponding DCI is not involved (for example, SPS HARQ-ACK codebook), the advance offset of the triggering time of other HARQ-ACK codebook(s) relative to the codebook transmission time can be directly assumed, or the time position of its virtual DCI is determined based on a time domain feedback offset (for example, K1 indicated or determined by the most recently activated or reactivated DCI of the SPS Config) corresponding to the specified HARQ-ACK (such as a serving cell index of the minimum or maximum index or a specified index and/or the HARQ-ACK corresponding to the SPS Config corresponding to the SPS Config index) corresponding to other HARQ-ACK codebook(s). Based on virtual DCI, refer to or follow the corresponding description of the triggering time of the type 3 codebook or the order of triggering DCI.

Based on the order of trigger times corresponding to the type 3 codebook and other HARQ-ACK codebook(s), it can be determined whether to transmit the type 3 codebook or other HARQ-ACK codebook(s), for example, the codebook type with an earlier or later trigger time is selected for transmission. The above only involves the selection between two codebook types. When determining to transmit the type 3 codebook, various methods corresponding to example 1 can be further used to determine and transmit a certain type 3 codebook or a composite codebook.

Optionally, a codebook with the earliest/latest trigger time is selected for transmission from one or more type 3 codebooks and other HARQ-ACK codebook(s) based on the trigger times.

For the relevant description of (2) above, please refer to rule 2 in example 2.

(3) determining is performed based on start times or end times of PUCCH resources carrying the type 3 codebook(s) and/or the other HARQ-ACK codebook(s).

For example, based on the start times or end times of the PUCCH resources corresponding to the type 3 codebook and other HARQ-ACK codebook(s), it can be determined whether to transmit the type 3 codebook or other HARQ-ACK codebook(s), for example, a codebook type corresponding to a codebook with the earliest or latest start time or end time of the PUCCH resource that carries the codebook is selected.

The above only involves the selection between two codebook types. When determining to transmit the type 3 codebook, various methods corresponding to example 1 can be further used to determine and transmit a certain type 3 codebook or a composite codebook.

Optionally, a codebook with the earliest or latest start time or end time of the PUCCH resource carrying the codebook is selected for transmission based on the start times/end times of the PUCCH resources carrying one or more type 3 codebooks and other HARQ-ACK codebook(s).

For the relevant description of (2) above, please refer to rule 3 in example 2.

(4) determining is performed based on identifiers or indexes of PUCCH resources carrying the type 3 codebook(s) and/or the other HARQ-ACK codebook(s).

For example, based on the IDs or identifiers of the PUCCH resources corresponding to the type 3 codebook and other HARQ-ACK codebook(s), it can be determined whether to transmit the type 3 codebook or other HARQ-ACK codebook(s), for example, a codebook type corresponding to a codebook with the smallest or largest ID or index of the PUCCH resource that carries the codebook is selected.

The above only involves the selection between two codebook types. When determining to transmit the type 3 codebook, various methods corresponding to example 1 can be further used to determine and transmit a certain type 3 codebook or a composite codebook.

Optionally, a codebook with the smallest or largest ID or index of the PUCCH resource carrying the codebook is selected for transmission based on the IDs or indexes of the PUCCH resources carrying one or more type 3 codebooks and other HARQ-ACK codebook(s).

For the relevant description of (2) above, please refer to rule 4 in example 2.

(5) determining is performed based on numbers of HARQ processes in the type 3 codebook(s) and/or the other HARQ-ACK codebook(s).

For example, it can be determined whether to transmit the type 3 codebook or other HARQ-ACK codebook(s) based on the numbers of HARQ processes corresponding to the type 3 codebook and other HARQ-ACK codebook(s), for example, a codebook type corresponding to a codebook corresponding to the most or least HARQ processes is selected.

The above only involves the selection between two codebook types. When determining to transmit the type 3 codebook, various methods corresponding to example 1 can be further used to determine and transmit a certain type 3 codebook or a composite codebook.

Optionally, based on the numbers of corresponding HARQ processes of one or more type 3 codebooks and other HARQ-ACK codebook(s), a codebook corresponding to the most or least HARQ processes can be selected for transmission.

For the relevant description of (2) above, please refer to rule 5 in example 2.

(6) determining is performed based on codebook indexes or state indexes corresponding to the type 3 codebook(s) and/or the other HARQ-ACK codebook(s).

The type 3 codebook may include an enhanced type 3 codebook and/or a Rel-16 type 3 codebook. For the codebook index or state index corresponding to the enhanced type 3 codebook and/or the Rel-16 type 3 codebook, refer to the above.

For other HARQ-ACK codebook(s), their corresponding codebook indexes or state indexes can be configured by the higher layer, or specified by the protocol.

It can be determined based on the codebook indexes or state indexes corresponding to the type 3 codebooks and other HARQ-ACK codebook(s) whether to transmit the type 3 codebooks or other HARQ-ACK codebook(s), for example, select a codebook type corresponding to the codebook with the largest or smallest codebook index or state index. The above only involves the selection between two codebook types. When determining to transmit the type 3 codebook, various methods corresponding to example 1 can be further used to determine and transmit a certain type 3 codebook or a composite codebook.

Optionally, based on the codebook indexes or state indexes of one or more type 3 codebooks and other HARQ-ACK codebook(s), a codebook corresponding to the largest or smallest codebook index or state index can be selected for transmission.

For the relevant description of (2) above, please refer to rule 6 in example 2.

In an implementation manner of the present application, trigger times of the type 3 codebooks and/or other HARQ-ACK codebook(s) are determined based on an order in which DCI is triggered.

In an implementation manner of this application, the method further includes:

determining, by the terminal, a physical layer priority corresponding to the target codebook; and feeding back, by the terminal, the target codebook according to a first codebook feedback method and the physical layer priority corresponding to the target codebook.

For description of the first codebook feedback method, refer to codebook feedback method 3-1 and codebook feedback method 3-2 in example 3.

In an implementation manner of the present application, the first codebook feedback method includes any one of the following (1) to (3):

(1) separately processing a codebook corresponding to each physical layer priority; and in a case that transmissions (such as PUCCH transmission or PUSCH transmission) carrying codebooks corresponding to different physical layer priorities overlap in time domain, only feeding back the target codebook with a high physical layer priority.

For cross-physical layer priority processing, the corresponding priority processing (prioritization) rule of Rel-16 can be followed or used. For example, only determined codebooks of higher physical layer priorities are fed back. For a codebook of a certain physical layer priority, follow the corresponding processing methods in example 1 and example 2.

For description of (1), please refer to the codebook feedback method 3-1 in example 3.

(2) allowing codebook multiplexing across physical layer priorities, or allowing simultaneous transmission of codebooks corresponding to different physical layer priorities.

For description of (2), please refer to the codebook feedback method 3-2 in example 3.

(3) directly feeding back the basic type 3 codebook.

Optionally, the basic type 3 codebook that is fed back corresponds to a higher physical layer priority.

For description of (3), please refer to the codebook feedback method 3-2-4 in example 3.

In an implementation of this application, simultaneous transmission of HARQ-ACK codebooks with different physical layer priorities is allowed, including one of the following (1) to (3):

(1) In the case that the UE supports the transmission of PUCCH carrying HARQ-ACKs corresponding to different physical layer priorities in a single time unit, the terminal separately transmits a target codebook corresponding to a high physical layer priority and a target codebook corresponding to a low physical layer priority on PUCCHs (not overlapped in time domain).

The codebook corresponding to each physical layer priority can be determined using the corresponding processing methods in example 1 and example 2.

For any physical layer priority, when the PUCCH and the PUSCH for transmitting the corresponding codebooks overlap in the time domain, the corresponding codebook can be further multiplexed for transmission on the PUSCH without transmitting the PUCCH.

For description of (1), please refer to the codebook feedback method 3-2-1 in example 3.

(2) When the UE supports simultaneous transmission of a PUCCH and a PUSCH, the terminal transmits a target codebook corresponding to a high physical layer priority on a PUCCH, and the terminal transmits a target codebook corresponding to a low physical layer priority on a PUSCH.

(3) When the UE supports simultaneous transmission of a PUCCH and a PUSCH, the terminal transmits a target codebook corresponding to a low physical layer priority on a PUCCH, and the terminal transmits a target codebook corresponding to a high physical layer priority on a PUSCH.

The PUCCH transmission and PUSCH transmission here may overlap in time domain. When there is time domain overlap, they are located on different serving cells. When there is no time domain overlap, they can be located on the same or different serving cells.

The codebook corresponding to each physical layer priority can be determined using the corresponding processing methods in example 1 and example 2.

For descriptions of (2) and (3), refer to the codebook feedback method 3-2-2 in example 3.

In an implementation of the present application, allowing codebook multiplexing across physical layer priorities includes:

the terminal multiplexes target codebooks corresponding to different physical layer priorities, and carries the multiplexed codebooks on one PUCCH for transmission.

The codebook corresponding to each physical layer priority can be determined using the corresponding processing methods in example 1 and example 2.

During multiplexing, codebooks corresponding to different physical layer priorities can be cascaded in a head-to-tail manner (for example, a codebook with a higher physical layer priority is cascaded after a codebook with a lower physical layer priority, or a codebook with a lower physical layer priority is cascaded after a codebook with a higher physical layer priority), or a codebook corresponding to each physical layer priority is independently encoded, rate matched, and resource element (Resource element, RE) mapped.

When the PUCCH for transmitting the multiplexed codebook overlaps with the PUSCH in the time domain, the multiplexed codebook can be further multiplexed for transmission on the PUSCH without transmitting the PUCCH.

For a description of this part, refer to the codebook feedback method 3-2-3 in example 3.

In an embodiment of the present application, the method further includes one of the following (1) to (2):

(1) not expecting, by the terminal, the network side to trigger the terminal to feed back multiple type 3 codebooks in a single time unit.

For relevant descriptions of (1), refer to the codebook feedback method 1-6 in example 1.

The network side needs to ensure through implementation that the number of Type-3 codebooks triggered in a single time unit does not exceed 1.

Optionally, the UE expects that when the network side triggers the terminal to feed back more than one type 3 codebook in a single time unit, the HARQ-ACK range corresponding to the type 3 codebook triggered later is larger, that is, must cover all HARQ processes corresponding to the previously triggered types 3 codebook. In his case, the UE can adopt any one of codebook feedback mode 1-1-1, codebook feedback mode 1-1-2 (the latest trigger time), and codebook feedback mode 1-1-5 (the most HARQ processes) to perform the corresponding operation.

It should be noted that the above optional case of UE expectation, there are other methods with the same operation results but more complicated operations, such as codebook feedback method 1-2 and codebook feedback method 1-4.

(2) not expecting, by the terminal, the network side to trigger the terminal to feed back, in a single time unit, the one or more type 3 codebooks and the other HARQ-ACK codebook(s) that need to be fed back.

For relevant descriptions of (2), refer to the codebook feedback method 2-6 in example 2.

Optionally, the UE expects that when the network triggers the terminal to feed back the type 3 codebook in a single time unit and other HARQ-ACK codebook(s) need to be fed back, the HARQ processes corresponding to the triggered type 3 codebook (or a type 3 codebook that has been triggered after transmission of DCI or PDSCHs corresponding to some or all HARQ-ACKs that have been triggered in other HARQ-ACK codebook(s)) must cover all HARQ processes corresponding to other HARQ-ACK codebook(s) (or all HARQ processes corresponding to some or all HARQ-ACKs that have been triggered in other HARQ-ACK codebook(s)).

In the embodiments of the present application, when one or more type 3 codebooks are triggered on the network side in a single time unit, or one or more type 3 codebooks are triggered on the network side in a single time unit, and other HARQ codebooks need to be fed back, the terminal can determine and feed back the target codebook according to one or more type 3 codebooks, or according to one or more type 3 codebooks and other HARQ-ACK codebook(s) that need to be fed back, thereby ensuring HARQ-ACK feedback performance and improving the reliability of the communication system.

Referring to FIG. 3, an embodiment of the present application provides a codebook feedback method. Specific steps include: step 301 and step 302.

Step 301: A network side device triggers a terminal to feed back one or more type 3 codebooks in a single time unit, or the network side device triggers the terminal to feed back one or more type 3 codebooks and other HARQ-ACK codebook(s) in a single time unit.

Step 302: The network side device obtains a target codebook fed back by the terminal, where the target codebook is determined by the terminal according to the one or more type 3 codebooks, or according to the one or more type 3 codebooks and other HARQ-ACK codebook(s) that need to be fed back.

In an implementation manner of the present application, the multiple type 3 codebooks correspond to a same physical layer priority;

or the one or more type 3 codebooks and the other HARQ-ACK codebook(s) that need to be fed back correspond to a same physical layer priority;

or at least one of the one or more type 3 codebooks and/or the other HARQ-ACK codebook(s) that need to be fed back corresponds to a different physical layer priority from that/those of other codebooks.

In one embodiment of the present application, in the case that the terminal does not expect the network to trigger the terminal to feed back multiple type 3 codebooks in a single time unit, the method further includes:

determining, by the network side device, that a number of type 3 codebooks fed back by the terminal in a single time unit is one.

In an implementation manner of this application, the method further includes:

determining, by the network side device, that HARQ processes corresponding to the type 3 codebooks fed back by the terminal in a single time unit cover all HARQ processes corresponding to the other HARQ-ACK codebook(s).

In the embodiments of the present application, when one or more type 3 codebooks are triggered on the network side in a single time unit, or one or more type 3 codebooks are triggered on the network side in a single time unit, and other HARQ codebooks need to be fed back, the network side device can obtain the target codebook determined and fed back by the terminal according to one or more type 3 codebooks, or according to one or more type 3 codebooks and other HARQ-ACK codebook(s) that need to be fed back, thereby ensuring HARQ-ACK feedback performance and improving the reliability of the communication system.

The following describes the implementation manner of the present application in conjunction with example 1, example 2 and example 3.

It should be noted that the time unit in example 1, example 2 and example 3 is explained by taking slot or sub-slot as an example. Other cases are similar and will not be described again here.

Example 1: the UE triggers one or more Type-3 codebooks in a single (or described as the same) slot or sub-slot, where the triggered one or more Type-3 codebooks correspond to a same physical layer priority.

The Type-3 codebook can include: Rel-16 Type-3 codebook and enhanced Type-3 codebook. The enhanced Type-3 codebook can be the enhanced Type-3 codebook in Rel-17, or multiple enhanced Type-3 codebooks. Different enhanced Type-3 codebooks correspond to different codebook sizes and/or reported information or content.

When the information or content of a Type-3 codebook triggered twice or more is completely consistent, it can be considered as a single (or the same) Type-3 codebook being triggered.

Example 1 includes: example 1-1 or example 1-2.

Example 1-1: When the network side only triggers the terminal to feed back one (or a single) Type-3 codebook, this Type-3 codebook is directly transmitted.

Figure 4:
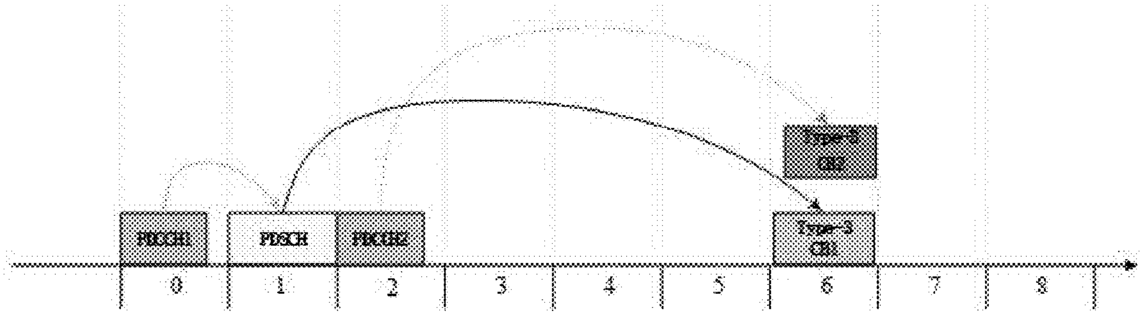
FIG. 4 is a schematic diagram in which the network side triggers a terminal to feed back multiple type 3 codebooks in a single time unit provided by an embodiment of the present application.

Example 1-2: Refer to FIG. 4, when the network side triggers the terminal to feed back multiple Type-3 codebooks (type-3 CB1 and type-3 CB2), any method in codebook feedback method 1-6 can be used:

Codebook feedback method 1-1: Select one of the Type-3 codebooks for transmission, such as type-3 CB1 or type-3 CB2.

Optionally, the codebook feedback method 1-1 may include: any method in codebook feedback method 1-1-1 to codebook feedback method 1-1-6:

Codebook feedback method 1-1-1: multiple Type-3 codebooks fed back by the terminal as triggered by the network side include (one) Rel-16 Type-3 codebook, select this Rel-16 Type-3 codebook.

Codebook feedback method 1-1-2: Select the Type-3 codebook with the earliest trigger time, or select the Type-3 codebook with the latest trigger time.

When the transmission of the type 3 codebook is triggered by DCI, the trigger time here can be determined using a DCI delivery time. A DCI time order can follow the rules in Rel-15 or Rel-16, for example, based on an order of PDCCH monitoring occasions (start time or end time) for DCI delivery. When times (such as start time or end time) of PDCCH monitoring occasions for two DCI deliveries are equal, arrangement may be further made in ascending order based on indexes of downlink serving cells.

The Type-3 codebook with the earliest trigger time can be understood as a Type-3 codebook triggered by the first triggering DCI among multiple triggering DCI (each triggering DCI corresponds to a Type-3 codebook).

The Type-3 codebook with the latest trigger time can be understood as a Type-3 codebook triggered by the last triggering DCI among multiple triggering DCI (each triggering DCI corresponds to a Type-3 codebook).

When multiple pieces of triggering DCI trigger a single (or the same) Type-3 codebook, for this type 3 codebook, only the earliest or latest single triggering DCI or the first or last triggering DCI among these pieces of triggering DCI is considered. That is, when selecting the type 3 codebook with the earliest or latest triggering time from the multiple type 3 codebooks, each triggered type 3 codebook only corresponds to one triggering DCI selected according to the aforementioned rules, and then one type 3 codebook is selected based on triggering DCI corresponding to each type 3 codebook.

Codebook feedback method 1-1-3: Select the Type-3 codebook with the earliest or latest start time of the PUCCH resource that carries the triggered Type-3 codebook, or select the Type-3 codebook with the earliest or latest end time of the PUCCH resource that carries the triggered Type-3 codebook.

Codebook feedback method 1-1-4: Select the Type-3 codebook with the smallest ID or index of the PUCCH resource that carries the triggered Type-3 codebook, or select the Type-3 codebook with the largest ID or index of the PUCCH resource that carries the triggered Type-3 codebook.

Codebook feedback method 1-1-5: Select the Type-3 codebook corresponding to the most HARQ processes, or select the Type-3 codebook corresponding to the least HARQ processes.

Codebook feedback method 1-1-6: Select the Type-3 codebook with the largest codebook index or state index, or select the Type-3 codebook with the smallest codebook index or state index.

The codebook index or state index can be configured by the high layer. For example, each enhanced Type-3 codebook can correspond to a certain state in the state list configured by the high layer, and by indicating the state index corresponding to this state in the triggering DCI, the corresponding enhanced Type-3 codebook can be triggered. The state index can be the index of a certain state in the state list, or can be configured independently for each state. The codebook index can directly be the state index here, or can be derived based on the state index, for example, converted based on a predefined formula.

Optionally, the Rel-16 Type-3 codebook can also correspond to a certain state in the above state list, or the Rel-16 Type-3 codebook does not correspond to a certain state in the above state list, but the codebook index or the state index of the Rel-16 Type-3 codebook is specified by the protocol or configured through high layer signaling.

Codebook feedback method 1-2: Based on the union of the HARQ process sets corresponding to triggered multiple Type-3 codebooks, the corresponding (new (or described as to be transmitted)) Type-3 codebook is constructed and transmitted.

The union of the HARQ process sets can be understood as that each HARQ process (process) appears at most once in the union. Based on this union, the new type 3 codebook can be constructed according to the construction principle of the type 3 codebook, for example, a HARQ-ACK bit order can be constructed based on a cycle structure of a serving cell or HARQ process or transport block (Transport Block, TB) index. The serving cell and HARQ processes involved in the traversal only cover HARQ processes in the union.

When one or more pieces of triggered DCIs are not directed, the UE and the network may have inconsistent understandings of the number of triggered type 3 codebooks, resulting in a misunderstanding of information or content of the (new) type 3 codebooks that are to be transmitted and a corresponding number of bits.

Codebook feedback method 1-3: Cascade multiple triggered Type-3 codebooks in a head-to-tail manner in a predefined order to obtain a composite codebook and transmit it The predefined order can adopt any method from order 1-1 to order 1-4:

- Order 1-1: Based on the corresponding time order of triggering DCI, for example, in ascending order of time, the time order of triggering DCI can be found in the previous description.
- Order 1-2: Based on the time order of PUCCH resources carrying the triggered Type-3 codebooks, for example, in ascending order according to the start times or end times of the PUCCH resources.
- Order 1-3: Based on the order of the IDs or indexes of the PUCCH resources carrying the triggered Type-3 codebooks, for example, in ascending order according to the IDs or indexes of the PUCCH resources.
- Order 1-4: Based on an order of the codebook indexes or state indexes corresponding to the triggered Type-3 codebooks, for example, in ascending order according to the codebook indexes or state indexes.

It can be understood that a single HARQ process may correspond to multiple (that is, more than one) HARQ-ACK bits in the composite codebook, and therefore there are redundant HARQ-ACK bits.

Optionally, each triggering DCI and the transmission corresponding to the triggered Type-3 codebook need to meet the UCI multiplexing Timeline requirements.

Codebook feedback methods 1-4: Search to determine a Type-3 codebook configured by a network or specified in the protocol, so that this Type-3 codebook can cover at least part of all HARQ processes corresponding to multiple Type-3 codebooks that are triggered, the Type-3 codebook determined by this search has the smallest number of bits, and this Type-3 codebook is transmitted Optionally, it is required that the HARQ processes covered by the Type-3 codebook determined by the search are most similar to the union of all HARQ processes corresponding to the multiple Type-3 codebooks that are triggered, for example, the HARQ process number difference (more than or less than) is the smallest.

When there is more than one Type-3 codebook that meets the requirements, a Type-3 codebook can be selected based on predefined rules. For example, the Type-3 codebook with the largest or smallest Codebook index or state index can be selected.

The Type-3 codebook determined by this search may be either a Rel-16 Type-3 codebook or an enhanced Type-3 codebook.

When the network side configures a state list for the UE, it can traverse each state in the state list to find the Type-3 codebook that meets the above requirements and corresponds to a certain state.

Codebook feedback methods 1-5: directing feed back the Rel-16 Type-3 codebook.

It should be noted that the codebook feedback method 1-5 is slightly different from the codebook feedback method 1-1-1.

Codebook feedback methods 1-5 are to directly feed back the Rel-16 Type-3 codebook as long as multiple Type-3 codebooks are triggered in a single Slot or Sub-slot, while codebook feedback methods 1-1-1 requires that Rel-16 Type-3 codebook is only fed back only when triggered multiple Type-3 codebooks include Rel-16 Type-3 codebook.

Codebook feedback methods 1 to 6: The UE does not expect the network to trigger multiple Type-3 codebooks in a single Slot or Sub-slot.

The network side needs to ensure through implementation that the number of Type-3 codebooks triggered in a single Slot or Sub-slot does not exceed 1.

Optionally, the UE expects that when the network side triggers more than one Type-3 codebook in a single Slot or Sub-slot, the HARQ-ACK range corresponding to the Type-3 codebook triggered later is larger, that is, must cover all HARQ processes corresponding to the previously triggered Type-3 codebook (it should be noted that based on the previous description, when the information or content of Type-3 codebooks triggered twice or more than twice is completely consistent, it can be considered as that a single Type-3 codebook is triggered). In this case, any one of codebook feedback mode 1-1-1, codebook feedback mode 1-1-2 (the latest trigger time), and codebook feedback mode 1-1-5 (the most HARQ processes) can be used to perform the corresponding operation.

It should be noted that there are other methods with the same operation results but more complicated operations, such as codebook feedback method 1-2 and codebook feedback method 1-4.

Figure 5:
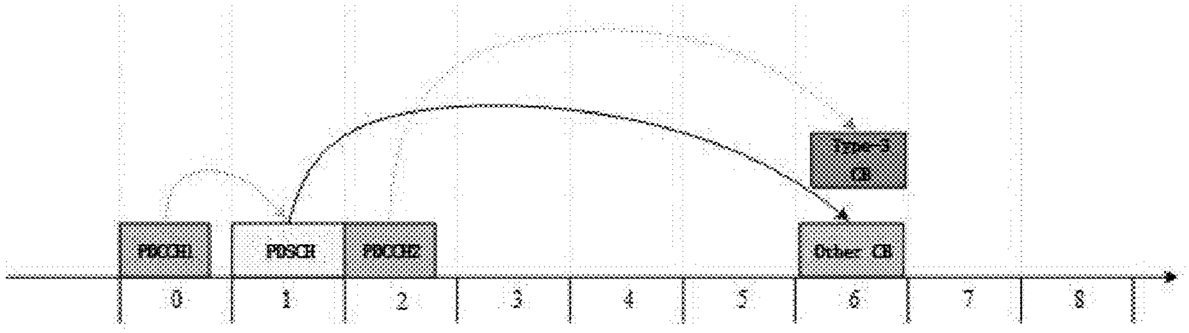
FIG. 5 is a schematic diagram in which the network side triggers a terminal to simultaneously feed back type 3 codebooks and other HARQ-ACK codebook(s) in a single time unit provided by an embodiment of the present application.

Example 2: When the UE triggers one or more Type-3 codebooks (Type-3 CB) in a single Slot or Sub-slot, and needs to feed back other HARQ-ACK codebook(s) (other CB), the triggered one or multiple Type-3 codebooks and other HARQ-ACK codebook(s) that need to be fed back correspond to the same physical layer priority. Refer to FIG. 5 for a schematic diagram.

Other HARQ-ACK codebook(s) that need to be fed back can be one of the SPS HARQ-ACK codebook (SPS HARQ-ACK only), Type-1 codebook, Type-2 codebook, and enhanced Type-2 codebook. Based on the provisions of the Rel-15 or Rel-16 protocol, it is currently understood that there is at most one other HARQ-ACK codebook that needs to be fed back in a single Slot or Sub-slot.

The codebook feedback methods in example 2 include: any one of codebook feedback method 2-1 to codebook feedback method 2-6:

Codebook feedback method 2-1: Only transmit the Type-3 codebook.

Specifically, various methods corresponding to example 1 can be adopted, including operations corresponding to example 1-1, and any method corresponding to example 1-2.

Optionally, when the UE triggers a Type-3 codebook in a single Slot or Sub-slot and needs to feed back other HARQ-ACK codebook(s), if the triggered Type-3 codebook is not a Rel-16 Type-3 codebook (It should be noted that if the triggered Type-3 codebook is a Rel-16 Type-3 codebook, based on the Rel-16 regulations, only the Rel-16 Type-3 codebook is transmitted at this time without additional operations), a method similar to codebook feedback method 1-4 can be used to search for a Type-3 codebook configured by the network or specified in the protocol, so that the Type-3 codebook determined by the search can cover all HARQ processes corresponding to the triggered Type-3 codebook and other HARQ-ACK codebook(s) that need to be fed back, the Type-3 codebook determined by the search has the smallest number of bits, and the Type-3 codebook determined by the search is transmitted.

Optionally, the HARQ processes covered by the Type-3 codebook determined by the search are most similar to the union of all HARQ processes corresponding to the single Type-3 codebooks that are triggered and other HARQ-ACK codebook(s) that need to be fed back, for example, the HARQ process number difference (more than or less than) is the smallest.

When there is more than one Type-3 codebook determined by the search, a Type-3 codebook can be selected based on predefined rules. For example, the Type-3 codebook with the largest codebook index or state index may be selected or the Type-3 codebook with the smallest codebook index or state index may be selected. When the network side configures a state list for the UE, it can traverse each state in the state list to find the Type-3 codebook that meets the above requirements and corresponds to a certain state.

When using codebook feedback methods 1-4, optionally, the type-3 codebook determined by the search can be further expanded so that the type-3 codebook determined by the search can cover all HARQ processes corresponding to multiple type-3 codebooks that are triggered and other HARQ-ACK codebook(s) that need to be fed back, and the number of bits of the Type-3 codebook determined by the search is the smallest, and the Type-3 codebook determined by the search is transmitted. Other processing is the same as or similar to the corresponding processing of codebook feedback method 1-4 and details are not given here.

It should be noted that when DCI miss-detection happens, HARQ processes that need to be reported in other HARQ-ACK codebook(s) may be understood inconsistently between two sides (the UE cannot know accurately the HARQ process occupied by a PDSCH reception corresponding to a DCI that is miss-detected; however, it should be clarified that when using Type-2 codebook or enhanced Type-2 codebook, the UE can generally determine a case of DCI miss-detection), resulting in that the Type-3 codebook (including the information or content contained in the codebook, and the corresponding number of bits, etc.) actually fed back is inconsistently understood between two sides.

Codebook feedback method 2-2: only transmit other HARQ-ACK codebook(s).

It is assumed here that the Type-3 codebook can further be triggered for retransmission as needed. Under normal circumstances, other HARQ-ACK codebook(s) include the initially transmitted HARQ-ACK codebook; and when it is an enhanced dynamic codebook, it may also include a retransmitted HARQ-ACK codebook.

Codebook feedback method 2-3: Determine the transmission of Type-3 codebook or other HARQ-ACK codebook(s) based on predefined rules.

The predefined rules can include: any one of Rule 1 to Rule 6:

Rule 1: When a Type-3 codebook contains all HARQ-ACK information in other HARQ-ACK codebook(s), only the Type-3 codebook is transmitted.

For example, when the type 3 codebook is a Rel-16 type 3 codebook, or contains HARQ-ACK information corresponding to all downlink HARQ processes configured in all serving cells currently activated by the UE, assuming that other HARQ-ACK codebook(s) are SPS HARQ-ACK codebooks, the UE can only transmit the type 3 codebook. When UE has not detected the DCI, it may not be able to determine the case of missed detection of the DCI or the HARQ process scheduled by the DCI not detected. Therefore, in some cases (for example, when the type 3 codebook only involves a part of the HARQ processes for a certain DL serving cell), it may not accurately determine the above inclusion relationship.

Rule 2: Determine based on a trigger time.

Optionally, the triggering time may be determined based on the order in which DCI is triggered.

For the triggering time of the type 3 codebook or order of triggering DCI, refer to the previous description.

For corresponding DCI of other HARQ-ACK codebook(s) (such as Type-1 codebook, Type-2 codebook, or enhanced Type-2 codebook), refer to or follow corresponding description of the triggering time of the type 3 codebook or the order of triggering DCI.

When the corresponding DCI is not involved (for example, SPS HARQ-ACK codebook), the advance offset of the triggering time of other HARQ-ACK codebook(s) relative to the codebook transmission time can be directly assumed, or the time position of its virtual DCI is determined based on a time domain feedback offset ((for example, K1 indicated or determined by the most recently activated or reactivated DCI of the SPS Config) corresponding to the specified HARQ-ACK (such as a serving cell index of the minimum or maximum index or a specified index and/or the HARQ-ACK corresponding to the SPS Config corresponding to the SPS Config index) corresponding to other HARQ-ACK codebook(s). Based on virtual DCI, refer to or follow the corresponding description of the triggering time of the type 3 codebook or the order of triggering DCI.

For example, based on the order of trigger times corresponding to the type 3 codebook and other HARQ-ACK codebook(s), it can be determined whether to transmit the type 3 codebook or other HARQ-ACK codebook(s), for example, the codebook type with an earlier or later trigger time is selected for transmission. The above only involves the selection between two codebook types. When determining to transmit the type 3 codebook, various methods corresponding to example 1 can be further used to determine and transmit a certain type 3 codebook or a composite codebook.

Optionally, a codebook with the earliest or latest trigger time is selected for transmission from one or more type 3 codebooks and other HARQ-ACK codebook(s) based on the trigger times.

Rule 3: Determine based on the start time or end time of the PUCCH resource carrying the codebook.

For example, based on the start times or end times of the PUCCH resources corresponding to the type 3 codebook and other HARQ-ACK codebook(s), it can be determined whether to transmit the type 3 codebook or other HARQ-ACK codebook(s), for example, a codebook type corresponding to a codebook with the earliest or latest start time or end time of the PUCCH resource that carries the codebook is selected.

The above only involves the selection between two codebook types. When determining to transmit the type 3 codebook, various methods corresponding to example 1 can be further used to determine and transmit a certain type 3 codebook or a composite codebook.

Optionally, a codebook with the earliest or latest start time or end time of the PUCCH resource carrying the codebook is selected for transmission based on the start times or end times of the PUCCH resources carrying one or more type 3 codebooks and other HARQ-ACK codebook(s).

Rule 4: Determine based on the ID or index of the PUCCH resource carrying the codebook.

Based on the IDs or identifiers of the PUCCH resources corresponding to the type 3 codebook and other HARQ-ACK codebook(s), it can be determined whether to transmit the type 3 codebook or other HARQ-ACK codebook(s), for example, a codebook type corresponding to a codebook with the smallest or largest ID or index of the PUCCH resource that carries the codebook is selected.

The above only involves the selection between two codebook types. When determining to transmit the type 3 codebook, various methods corresponding to example 1 can be further used to determine and transmit a certain type 3 codebook or a composite codebook.

Optionally, a codebook with the smallest or largest ID or index of the PUCCH resource carrying the codebook is selected for transmission based on the IDs or indexes of the PUCCH resources carrying one or more type 3 codebooks and other HARQ-ACK codebook(s).

Rule 5: Determine based on the number of corresponding HARQ processes.

Based on the numbers of HARQ processes corresponding to the type 3 codebook and other HARQ-ACK codebook(s), it can be determined whether to transmit the type 3 codebook or other HARQ-ACK codebook(s), for example, a codebook type corresponding to a codebook corresponding to the most HARQ processes is selected, or a codebook type corresponding to a codebook corresponding to the least HARQ processes is selected.

The above only involves the selection between two codebook types. When determining to transmit the type 3 codebook, various methods corresponding to example 1 can be further used to determine and transmit a certain type 3 codebook or a composite codebook.

Optionally, based on the numbers of corresponding HARQ processes of one or more type 3 codebooks and other HARQ-ACK codebook(s), a codebook corresponding to the most HARQ processes can be selected for transmission, or a codebook corresponding to the least HARQ processes can be selected for transmission.

Rule 6: Determine based on a codebook index or a state index.

For the codebook index or state index corresponding to the enhanced Type-3 codebook and/or Rel-16 Type-3 codebook, refer to the previous description.

For other HARQ-ACK codebook(s), their corresponding codebook indexes or state indexes can be configured by the higher layer, or specified by the protocol.

Based on the codebook indexes or state indexes corresponding to the type 3 codebook and other HARQ-ACK codebook(s), it can be determined whether to transmit the type 3 codebook or other HARQ-ACK codebook(s), for example, a codebook type corresponding to a codebook with the largest or smallest codebook index or state index is selected. The above only involves the selection between two codebook types. When determining to transmit the type 3 codebook, various methods corresponding to example 1 can be further used to determine and transmit a certain type 3 codebook or a composite codebook.

Optionally, based on the corresponding codebook indexes or state indexes of one or more Type-3 codebooks and other HARQ-ACK codebook(s), the codebook with the largest or smallest corresponding codebook index or state index is selected for transmission.

Codebook feedback method 2-4: cascade, in a head-to-tail manner in a predefined order, codebooks to be transmitted, to obtain a composite codebook and transmit it The codebooks that need to be transmitted here include one or more Type-3 codebooks that are triggered, and other HARQ-ACK codebook(s) that need to be fed back.

Optionally, some codebooks can be selected for head-to-tail cascading and transmission. For example, only the Type-3 codebook with the largest or smallest Codebook index or State index can be selected for head-to-tail cascading with other HARQ-ACK codebook(s) that need to be fed back.

The predefined order in codebook feedback method 2-4 can include: any method from order 2-1 to order 2-5:

Order 2-1: Cascade other HARQ-ACK codebook(s) after the Type-3 codebook bit order, or cascade the Type-3 codebook bit order after other HARQ-ACK codebook(s).

When there is only one type 3 codebook that needs to be transmitted, the type 3 codebook bit order here is the type 3 codebook. When there is more than one type 3 codebook that needs to be transmitted, the type 3 codebook bit order here can be a composite codebook obtained by cascading the more than one type 3 codebook in a head-to-tail manner in a predefined order according to the operation described in codebook feedback method 1-3.

Order 2-2: Based on the corresponding time order of triggering DCI.

For example, the corresponding ascending order of triggering times of DCI is used, and for the order of triggering times of DCI, refer to the previous description.

For Type-3 codebook, its corresponding (single) triggering DCI is as described above.

For Type-1 codebook, Type-2 codebook, and enhanced Type-2 codebook, the last DCI carrying the corresponding HARQ-ACK can be used as its corresponding (single) triggering DCI.

For an SPS HARQ-ACK codebook (SPS HARQ-ACK only), there is no corresponding triggering DCI. Alternatively, virtual DCI is determined based on the most recently activated or reactivated DCI corresponding to carried SPS HARQ-ACK (when multiple SPS configurations (Config) are involved, SPS HARQ-ACK corresponding to SPS Config with the minimum or maximum index or a predefined value can be considered) and the applied K1.

Order 2-3: based on the time order of PUCCH resources carrying codebooks.

For example, the ascending order of start times or end times of the PUCCH resources carrying codebooks is used.

Order 2-4: Based on the order of the IDs or indexes of the PUCCH resources carrying codebooks, for example, in ascending order of IDs or indexes.

Order 2-5: Based on an order of the codebook indexes or state indexes corresponding to the codebooks, for example, in ascending order according to the codebook indexes or state indexes.

For the Codebook index or State index corresponding to Type-3 codebook, refer to the previous description.

For other HARQ-ACK codebook(s), their corresponding Codebook index or State index can be specified by the protocol or configured based on high layer signaling.

It can be understood that a single HARQ process or PDSCH transmission may correspond to multiple HARQ-ACK bits in the composite codebook, and therefore there are redundant HARQ-ACK bits.

Optionally, when the HARQ-ACK corresponding to a certain HARQ process is already included in other HARQ-ACK codebook(s), reported information including HARQ-ACK, NDI, or the like corresponding to this HARQ process is deleted from one or more cascaded type 3 codebooks.

Optionally, each triggering DCI and the transmission corresponding to the corresponding codebook need to meet the predefined timeline requirement. The timeline requirement here can be the UCI multiplexing timeline requirement defined by Rel-15 or Rel-16, and/or PUCCH overriding (overriding) timeline requirement, and/or other timeline requirements.

Codebook feedback methods 2-5: directing feed back the Rel-16 Type-3 codebook.

Codebook feedback method 2-6: The UE does not expect a case, where the network triggers Type-3 codebook(s) to be reported in a Slot or Sub-slot and the UE needs to feed back other HARQ-ACK codebooks in the Slot or Sub-slot.

The network side needs to avoid this situation through implementation.

Optionally, the UE expects that when the network triggers the type 3 codebook in a single Slot or Sub-slot and other HARQ-ACK codebook(s) need to be fed back, the HARQ processes corresponding to the triggered type 3 codebook (or a type 3 codebook that has been triggered after transmission of DCI or PDSCHs corresponding to some or all HARQ-ACKs that have been triggered in other HARQ-ACK codebook(s)) must cover all HARQ processes corresponding to other HARQ-ACK codebook(s) (or all HARQ processes corresponding to some or all HARQ-ACKs that have been triggered in other HARQ-ACK codebook(s)).

Example 3: When the UE triggers one or more Type-3 codebooks in a single Slot or Sub-slot, and optionally other HARQ-ACK codebook(s) (one or two; when there are two, each corresponds to a different physical layer priority), at least one codebook of one or more Type-3 codebooks and/or other HARQ-ACK codebook(s) corresponds to a different physical layer priority from that/those of other codebooks.

Example 3 may include: any one of codebook feedback method 3-1 to codebook feedback method 3-2:

Codebook feedback method 3-1: For cross-physical layer priority processing, the corresponding priority (prioritization) rule of Rel-16 can be followed/used (only determined codebooks of higher physical layer priorities are fed back). For a certain priority, follow the corresponding processing methods in example 1 and example 2.

Codebook feedback method 3-2: allow HARQ-ACK multiplexing across physical layer priorities, or allow simultaneous transmission of HARQ-ACKs with different physical layer priorities.

Codebook feedback method 3-2 can include any one of the following: codebook feedback method 3-2-1 to codebook feedback method 3-2-4:

Codebook feedback method 3-2-1: When the UE supports the transmission of PUCCHs carrying HARQ-ACK corresponding to different physical layer priorities in a single Slot or Sub-slot, the UE separately transmits the codebook corresponding to the higher physical layer priority and the codebook corresponding to the lower physical layer priority on (not overlapped in time domain) PUCCHs.

The codebook corresponding to each physical layer priority can be determined using the corresponding processing methods in example 1 and example 2.

For any physical layer priority, when the PUCCH and the PUSCH for transmitting the corresponding codebooks overlap in the time domain, the corresponding codebook can be further multiplexed for transmission on the PUSCH without transmitting the PUCCH.

Codebook feedback method 3-2-2: When the UE supports simultaneous transmission of a PUCCH and a PUSCH, the UE transmits the codebook corresponding to the higher/lower physical layer priority on the PUCCH and transmits the codebook corresponding to the lower/higher physical layer on the PUSCH.

The PUCCH transmission and PUSCH transmission here may overlap in time domain. When there is time domain overlap, they are located on different serving cells. When there is no time domain overlap, they can be located on the same or different serving cells.

The codebook corresponding to each physical layer priority can be determined using the corresponding processing methods in example 1 and example 2.

Codebook feedback method 3-2-3: The UE multiplexes codebooks corresponding to different physical layer priorities, and carries the multiplexed codebooks on a single PUCCH for transmission.

The codebook corresponding to each physical layer priority can be determined using the corresponding processing methods in example 1 and example 2.

During multiplexing, codebooks corresponding to different physical layer priorities can be cascaded in a head-to-tail manner (for example, a codebook with a higher physical layer priority is cascaded after a codebook with a lower physical layer priority, or a codebook with a lower physical layer priority is cascaded after a codebook with a higher physical layer priority), or a codebook corresponding to each physical layer priority is independently encoded, rate matched, and RE mapped.

When the PUCCH for transmitting the multiplexed codebook overlaps with the PUSCH in the time domain, the multiplexed codebook can be further multiplexed for transmission on the PUSCH without transmitting the PUCCH.

Codebook feedback method 3-2-4: directly feed back the Rel-16 Type-3 codebook

Optionally, the Rel-16 Type-3 codebook that is fed back corresponds to a higher physical layer priority.

Figure 6:
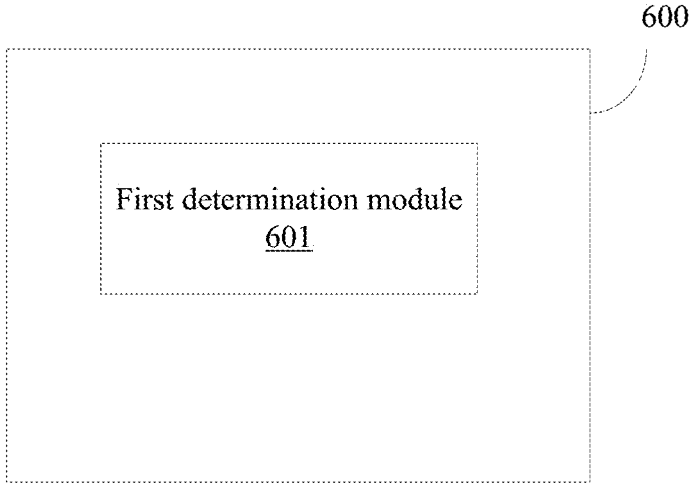
FIG. 6 is a schematic diagram 1 of a codebook feedback apparatus provided by an embodiment of the present application.

Referring to FIG. 6, an embodiment of the present application provides a codebook feedback apparatus, and the apparatus 600 includes:

a first determination module 601, configured to determine a target codebook for feedback based on one or more type 3 codebooks, or based on one or more type 3 codebooks and other hybrid automatic repeat request acknowledgement HARQ-ACK codebooks that need to be fed back;

where the one or more type 3 codebooks need to be fed back by the terminal in a single time unit as triggered by a network side, or the one or more type 3 codebooks and other HARQ-ACK codebook(s) that need to be fed back need to be fed back by the terminal in a single time unit as triggered by the network side.

In an implementation manner of the present application, the multiple type 3 codebooks correspond to a same physical layer priority;

or the one or more type 3 codebooks and the other HARQ-ACK codebook(s) that need to be fed back correspond to a same physical layer priority;

or at least one of the one or more type 3 codebooks and/or the other HARQ-ACK codebook(s) that need to be fed back corresponds to a different physical layer priority from that/those of other codebooks.

In an implementation manner of the present application, the first determination module 601 is further configured to:

determine a target HARQ-ACK for feedback according to a first codebook determination method, the one or more type 3 codebooks, and the other HARQ-ACK codebook(s) that need to be fed back;

or determine a type of the target HARQ-ACK for feedback according to a second codebook determination method; and in a case that the type of the target HARQ-ACK is a type 3 codebook, determine the target codebook for feedback based on the one or more type 3 codebooks; and in a case that the type of the target HARQ-ACK is a type corresponding to the other HARQ-ACK codebook(s), determine the target codebook for feedback based on the other HARQ-ACK codebook(s).

In an implementation manner of the present application, the first determination module 601 is further configured to:

in a case that the network side triggers the terminal to feed back one type 3 codebook in a single time unit, determine to feed back the type 3 codebook;

or in a case that the network side triggers the terminal to feed back multiple type 3 codebooks in a single time unit, determine the target codebook for feedback according to a third codebook determination method.

In an implementation manner of the present application, the third codebook determination method includes any one of the following:

selecting one type 3 codebook from the triggered multiple type 3 codebooks;

constructing a new type 3 codebook according to the union of HARQ process sets corresponding to the triggered multiple type 3 codebooks;

cascading the triggered multiple type 3 codebooks in a first order in a head-to-tail manner to obtain a composite codebook;

determining a first type 3 codebook that meets a first condition; and determining to directly feed back a basic type 3 codebook.

In an implementation manner of the present application, the first condition includes:

the first type 3 codebook meets a first requirement, and the first type 3 codebook has the smallest number of bits among all type 3 codebooks that meet the first requirement in various types of sets of type 3 codebooks, where the first requirement is: HARQ-ACKs corresponding to all HARQ processes corresponding to any one of the triggered multiple type 3 codebooks;

or the first type 3 codebook meets a second requirement, and the first type 3 codebook has the smallest number of bits among all type 3 codebooks that meet the second requirement, where the second requirement is: HARQ-ACKs corresponding to all HARQ processes corresponding to the triggered one or more type 3 codebooks and other HARQ-ACK codebook(s);

or the first type 3 codebook meets a third requirement, and the third requirement is: a HARQ process number difference between all HARQ processes corresponding to the type 3 codebooks in various types of sets of type 3 codebooks and a first union is the smallest, and the first union is a union of all HARQ processes corresponding to the triggered multiple type 3 codebooks;

or the first type 3 codebook meets a fourth requirement, and the fourth requirement is: a HARQ process number difference between all HARQ processes corresponding to the type 3 codebooks in various types of sets of type 3 codebooks and a second union is the smallest, and the second union is a union of all HARQ processes corresponding to the triggered one or more type 3 codebooks and the other HARQ-ACK codebook(s).

In an implementation of the present application, a HARQ process number difference between HARQ processes covered by the first type 3 codebook and the union of all HARQ processes corresponding to the triggered multiple type 3 codebooks is the smallest;

or a HARQ process number difference between HARQ processes covered by the first type 3 codebook and the union of all HARQ processes corresponding to the triggered one or more type 3 codebooks and the other HARQ-ACK codebook(s) that need to be fed back is the smallest.

In an implementation manner of the present application, determining the first type 3 codebook that meets the first condition includes:

in a case that there are multiple type 3 codebooks that satisfy the first condition, selecting one type 3 codebook from the multiple type 3 codebooks as the first type 3 codebook.

In an implementation manner of the present application, a state corresponding to the first type 3 codebook is included in a state list configured on the network side.

In an implementation manner of the present application, the first type 3 codebook includes: a base type 3 codebook and/or an enhanced type 3 codebook.

In an implementation manner of the present application, selecting one type 3 codebook from the triggered multiple type 3 codebooks includes any one of the following:

in a case that the multiple type 3 codebooks include a basic type 3 codebook, selecting the basic type 3 codebook;

selecting a type 3 codebook with the earliest trigger time from the multiple type 3 codebooks;

selecting a type 3 codebook with the latest trigger time from the multiple type 3 codebooks;

selecting a type 3 codebook with the earliest or latest start time of a corresponding physical uplink control channel resource from the multiple type 3 codebooks;

selecting a type 3 codebook with the earliest or latest end time of a corresponding physical uplink control channel resource from the multiple type 3 codebooks;

selecting a type 3 codebook with the smallest identifier or index of a corresponding physical uplink control channel resource from the multiple type 3 codebooks;

selecting a type 3 codebook with the largest identifier or index of a corresponding physical uplink control channel resource from the multiple type 3 codebooks;

selecting a type 3 codebook with the largest number of corresponding HARQ processes from the multiple type 3 codebooks;

selecting a type 3 codebook with the smallest number of corresponding HARQ processes from the multiple type 3 codebooks;

selecting a type 3 codebook with the largest codebook index or state index from the multiple type 3 codebooks; and selecting a type 3 codebook with the smallest codebook index or state index from the multiple type 3 codebooks.

In an embodiment of the present application, the first order is determined according to any one of the following:

a corresponding time order for triggering downlink control information;

a time order of physical uplink control channel resources carrying the type 3 codebooks;

a size order of identifiers or indexes of physical uplink control channel resources carrying the type 3 codebook; and a size order of codebook indexes or state indexes corresponding to the type 3 codebooks.

In an implementation manner of the present application, the first codebook determination method includes one any of the following:

cascading, in a second order in a head-to-tail manner, a part of the one or more type 3 codebooks and other HARQ-ACK codebook(s) that need to be fed back, to obtain a composite codebook; and directly feeding back the basic type 3 codebook.

In an embodiment of the present application, the second order includes:

cascading the other HARQ-ACK codebook(s) after a bit order corresponding to the one or more type 3 codebooks, or cascading the bit order corresponding to the one or more type 3 codebooks after the other HARQ-ACK codebook(s).

In an embodiment of the present application, the second order is determined according to any one of the following:

a first time order, where the first time order is an order of trigger times of downlink control information corresponding to the one or more type 3 codebooks, and trigger times of downlink control information corresponding to the other HARQ-ACK codebook(s) that need to be fed back;

a second time order, where the second time order is an order of times of physical uplink control channel resources carrying the one or more type 3 codebooks, and times of physical uplink control channel resources carrying the other HARQ-ACK codebook(s) that need to be fed back;

a first size order, where the first size order is a size order of identifiers or indexes of physical uplink control channel resources carrying the one or more type 3 codebooks, and identifiers or indexes of physical uplink control channel resources carrying the other HARQ-ACK codebook(s) that need to be fed back; and a second size order, where the second size order is a size order of codebook indexes or state indexes corresponding to the one or more type 3 codebooks and codebook indexes or state indexes corresponding to the other HARQ-ACK codebook(s) that need to be fed back.

In an implementation manner of the present application, the second codebook determination method includes any one of the following:

only type 3 codebooks are transmitted;

only the other HARQ-ACK codebook(s) are fed back; and whether to feed back the type 3 codebooks or the other HARQ-ACK codebook(s) is determined according to a first rule.

In an implementation manner of this application, the first rule includes any one of the following:

in a case that the type 3 codebook(s) include all HARQ-ACK information in the other HARQ-ACK codebook(s), only the type 3 codebook(s) are fed back;

determining is performed based on triggering times of the type 3 codebook(s) and/or the other HARQ-ACK codebook(s);

determining is performed based on start times or end times of PUCCH resources carrying the type 3 codebook(s) and/or the other HARQ-ACK codebook(s);

determining is performed based on identifiers or indexes of PUCCH resources carrying the type 3 codebook(s) and/or the other HARQ-ACK codebook(s);

determining is performed based on numbers of HARQ processes in the type 3 codebook(s) and/or the other HARQ-ACK codebook(s); and determining is performed based on codebook indexes or state indexes corresponding to the type 3 codebook(s) and/or the other HARQ-ACK codebook(s).

In an implementation manner of the present application, trigger times of the type 3 codebooks and/or other HARQ-ACK codebook(s) are determined based on an order in which DCI is triggered.

In an embodiment of the present application, the apparatus also includes:

a second determination module, configured to determine a physical layer priority corresponding to the target codebook; and a transmission module, configured to feed back the target codebook according to a first codebook feedback method and the physical layer priority corresponding to the target codebook.

In an implementation manner of the present application, the first codebook feedback method includes any one of the following:

separately processing a codebook corresponding to each physical layer priority; and in a case that transmissions carrying codebooks corresponding to different physical layer priorities overlap in time domain, only feeding back the target codebook with a high physical layer priority;

allowing codebook multiplexing across physical layer priorities, or allowing simultaneous transmission of codebooks corresponding to different physical layer priorities; and directly feeding back the basic type 3 codebook.

In an implementation of the present application, allowing simultaneous transmission of codebooks with different physical layer priorities includes:

the terminal transmits a target codebook corresponding to a high physical layer priority and a target codebook corresponding to a low physical layer priority on a PUCCH respectively;

or the terminal transmits a target codebook corresponding to a high physical layer priority on a PUCCH, and the terminal transmits a target codebook corresponding to a low physical layer priority on a PUSCH;

or the terminal transmits a target codebook corresponding to a low physical layer priority on a PUCCH, and the terminal transmits a target codebook corresponding to a high physical layer priority on a PUSCH.

In an implementation of the present application, allowing codebook multiplexing across physical layer priorities includes:

the terminal multiplexes target codebooks corresponding to different physical layer priorities, and carries the multiplexed codebooks on one PUCCH for transmission.

In an embodiment of the present application, the apparatus also includes:

a processing module, configured to not expect the network side to trigger the terminal to feed back multiple type 3 codebooks in a single time unit, or not expect the network side to trigger the terminal to feed back, in a single time unit, the one or more type 3 codebooks and the other HARQ-ACK codebook(s) that need to be fed back.

The apparatus provided in this embodiment of this application can implement the processes implemented in the method embodiment shown in FIG. 2 and achieve a same technical effect. To avoid repetition, details are not described herein again.

Figure 7:
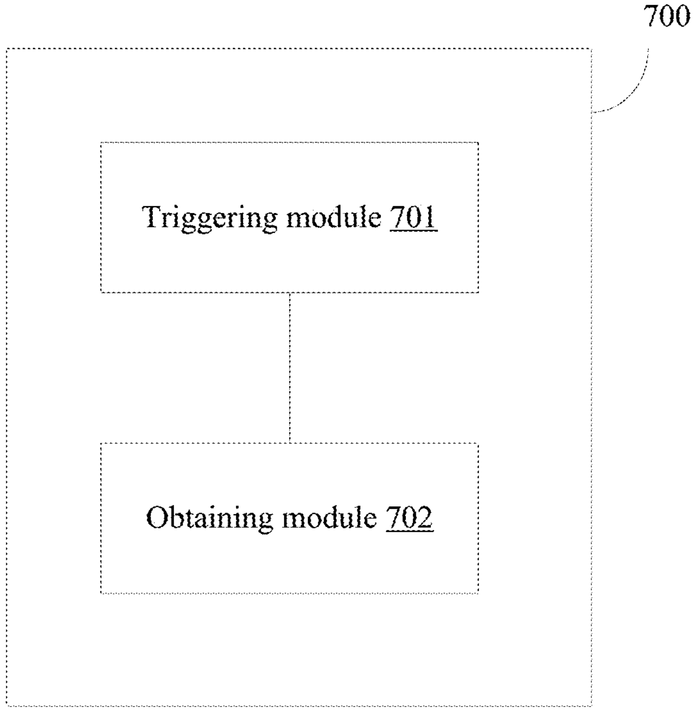
FIG. 7 is a flowchart 2 of a codebook feedback apparatus provided by an embodiment of the present application.

Referring to FIG. 7, an embodiment of the present application provides a codebook feedback apparatus, applied to a network side device, and the apparatus 700 includes:

a triggering module 701, configured to trigger a terminal to feed back one or more type 3 codebooks in a single time unit, or trigger the terminal to feed back, in a single time unit, one or more type 3 codebooks and other HARQ-ACK codebook(s) that need to be fed back; and an obtaining module 702, configured to obtain a target codebook fed back by the terminal, where the target codebook is determined by the terminal according to the one or more type 3 codebooks, or according to the one or more type 3 codebooks and other HARQ-ACK codebook(s) that need to be fed back.

In an implementation manner of the present application, the multiple type 3 codebooks correspond to a same physical layer priority;

or the one or more type 3 codebooks and the other HARQ-ACK codebook(s) that need to be fed back correspond to a same physical layer priority;

or at least one of the one or more type 3 codebooks and/or the other HARQ-ACK codebook(s) that need to be fed back corresponds to a different physical layer priority from that/those of other codebooks.

In an embodiment of the present application, the apparatus also includes:

a third determination module, configured to determine that a number of type 3 codebooks fed back by the terminal in a single time unit is one.

In an embodiment of the present application, the apparatus also includes:

a fourth determination module, configured to determine that HARQ processes corresponding to the type 3 codebooks fed back by the terminal in a single time unit cover all HARQ processes corresponding to the other HARQ-ACK codebook(s).

The apparatus provided in this embodiment of this application can implement the processes implemented in the method embodiment shown in FIG. 3 and achieve a same technical effect. To avoid repetition, details are not described herein again.

Embodiments of the present application also provide a terminal, including a processor and a communication interface. The processor is configured to determine a target codebook for feedback according to one or more type 3 codebooks, or according to one or more type 3 codebooks and other HARQ-ACK codebook(s) that need to be fed back; where the one or more type 3 codebooks need to be fed back by the terminal in a single time unit as triggered by a network side, or the one or more type 3 codebooks and other HARQ-ACK codebook(s) need to be fed back by the terminal in a single time unit as triggered by the network side. This terminal embodiment corresponds to the foregoing method embodiment on the terminal side. Each implementation process and implementation of the foregoing method embodiment may be applicable to this terminal embodiment, and a same technical effect can be achieved.

Figure 8:
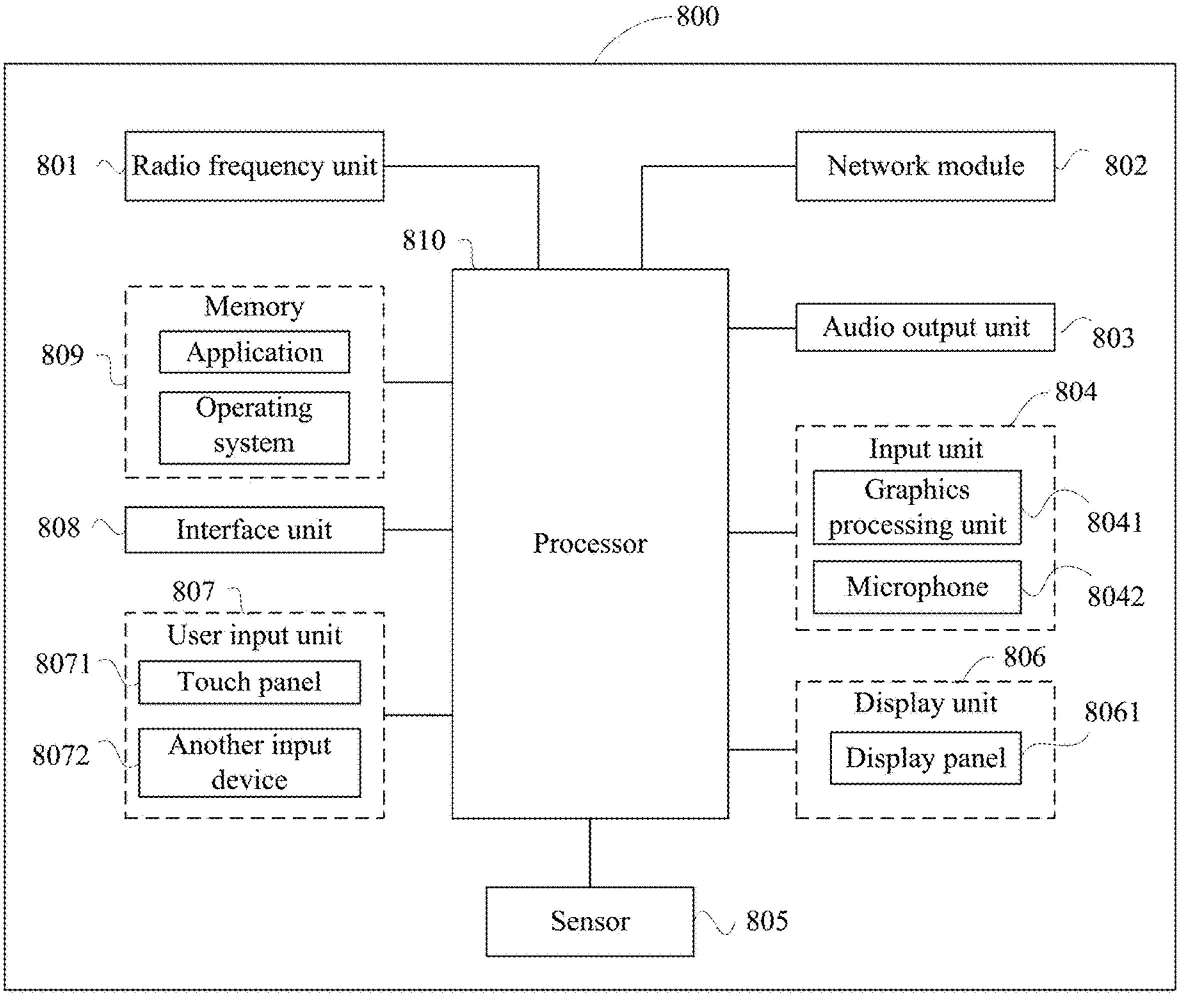
FIG. 8 is a schematic diagram of a terminal provided by an embodiment of the present application.

Specifically, FIG. 8 is a schematic diagram of a hardware structure of a terminal implementing an embodiment of the present application. The terminal 800 includes, but is not limited to, at least some components of a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that in the embodiments of this application, the input unit 804 may include a graphics processing unit (Graphics Processing Unit, GPU) 8041 and a microphone 8042, and the graphics processing unit 8041 processes image data of a still picture or video obtained by an image capture apparatus (such as a camera) in a video capture mode or an image capture mode. The display unit 806 may include a display panel 8061. Optionally, the display panel 8061 may be configured in a form such as a liquid crystal display or an organic light-emitting diode. The user input unit 807 includes a touch panel 8071 and another input device 8072. The touch panel 8061 is also referred to as a touchscreen. The touch panel 8061 may include two parts: a touch detection apparatus and a touch controller. The another input device 8072 may include, but is not limited to, a physical keyboard, a function key (such as a volume control key or an on/off key), a trackball, a mouse, and a joystick. Details are not described herein again.

In this embodiment of this application, the radio frequency unit 801 receives downlink data from a network side device and then sends the downlink data to the processor 810 for processing; and sends uplink data to the network side device. Usually, the radio frequency unit 801 includes but is not limited to an antenna, at least one amplifier, a transceiver, a coupler, a low noise amplifier, a duplexer, and the like.

The memory 809 may be configured to store a software program or an instruction and various data. The memory 809 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory and non-volatile memory. The nonvolatile memory may be a read-only memory (Read-only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or other non-volatile solid state storage devices.

The processor 810 may include one or more processing units. Optionally, the processor 810 may be integrated with an application processor and a modem processor. The application processor mainly processes the operating system, the user interface, and applications or instructions. The modem processor mainly processes wireless communication such as a baseband processor. It can be understood that the modem processor does not need to be integrated into the processor 810.

In the embodiments of the present application, the processor 810 is configured to determine a target codebook for feedback according to one or more type 3 codebooks, or according to one or more type 3 codebooks and other HARQ-ACK codebook(s) that need to be fed back; where the one or more type 3 codebooks need to be fed back by the terminal in a single time unit as triggered by a network side, or the one or more type 3 codebooks and other HARQ-ACK codebook(s) that need to be fed back need to be fed back by the terminal in a single time unit as triggered by the network side.

The terminal provided in this embodiment of this application can implement the processes implemented in the method embodiment shown in FIG. 2, and achieve a same technical effect. To avoid repetition, details are not provided herein again.

Figure 9:
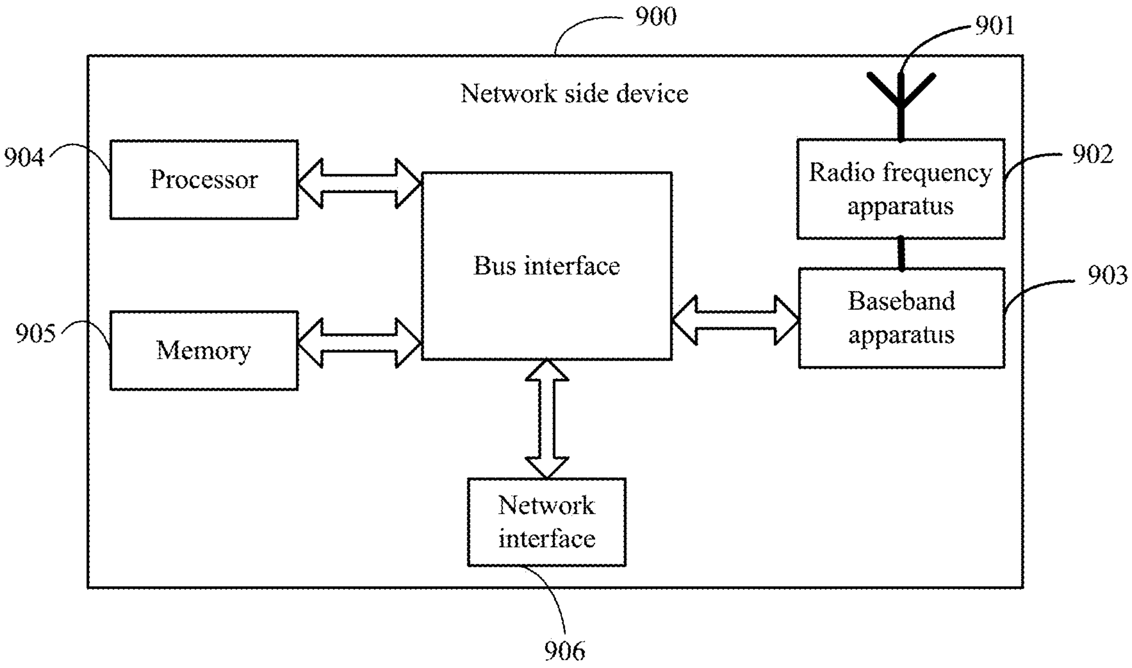
FIG. 9 is a schematic diagram of a network side device provided by an embodiment of the present application.

Referring to FIG. 9, an embodiment of the present application also provides a network side device. As shown in FIG. 9, a network side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes to-be-sent information, and sends the information to the radio frequency apparatus 902. The radio frequency apparatus 902 processes the received information and then sends the information by using the antenna 901.

The frequency band processing apparatus may be located in the baseband apparatus 903. The method performed by the network side device in the foregoing embodiment may be implemented in the baseband apparatus 903. The baseband apparatus 903 includes a processor 904 and a memory 905.

The baseband apparatus 903 may include, for example, at least one baseband board, where multiple chips are disposed on the baseband board. As shown in FIG. 8, one chip is, for example, the processor 904, which is connected to the memory 905, so as to invoke a program in the memory 905 to perform operations of the network device shown in the foregoing method embodiment.

The baseband apparatus 903 may further include a network interface 906, configured to exchange information with the radio frequency apparatus 902, where the interface is, for example, a common public radio interface (common public radio interface, CPRI for short).

Specifically, the network side device in this embodiment of the present application further includes: instructions or programs stored in the memory 905 and executable on the processor 904.

In an embodiment of the present application, the processor 904 is configured to trigger the terminal to feed back one or more type 3 codebooks in a single time unit, or trigger the terminal to feed back, in a single time unit, one or more type 3 codebooks and other HARQ-ACK codebook(s) that need to be fed back; and obtain a target codebook fed back by the terminal, where the target codebook is determined by the terminal according to one or more type 3 codebooks, or according to one or more type 3 codebooks and other HARQ-ACK codebook(s) that need to be fed back.

It can be understood that the processor 904 invokes instructions or programs in the memory 905 to execute the methods executed by the modules shown in FIG. 7 and achieve the same technical effect. To avoid repetition, details are not repeated here.

Figure 10:
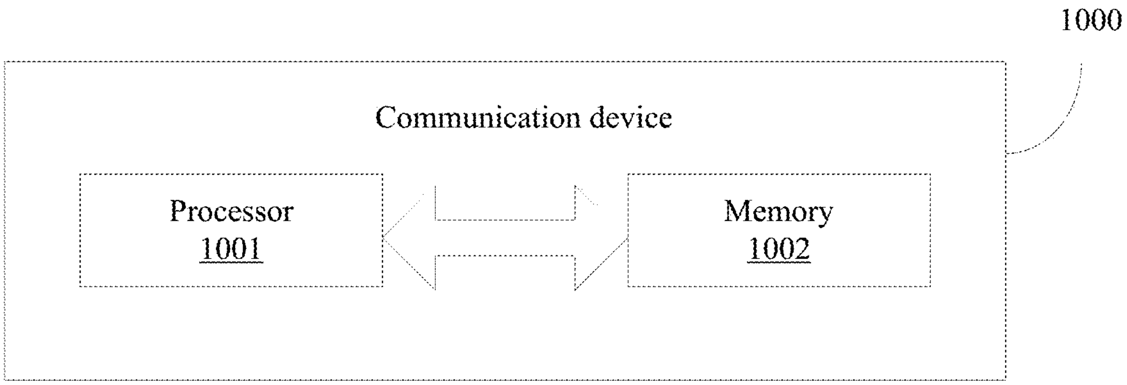
FIG. 10 is a schematic diagram of a communications device provided by an embodiment of this application.

Optionally, as shown in FIG. 10, an embodiment of this application further provides a communication device 1000, including a processor 1001, a memory 1002, and a program or instructions stored in the memory 1002 and capable of running on the processor 1001. For example, in a case that the communication device 1000 is a terminal, when the program or the instructions are executed by the processor 1001, each process of the method embodiment in FIG. 2 is implemented, and a same technical effect is achieved. In a case that the communication device 1000 is a network side device, when the program or the instructions are executed by the processor 1001, each process of the method embodiment in FIG. 3 is implemented, and a same technical effect is achieved. To avoid repetition, details are not described herein again.

An embodiment of this application further provides a computer program/program product, the computer program/program product is stored in a non-volatile storage medium, and when the computer program/program product is executed by at least one processor, the step of the processing method according to FIG. 2 or FIG. 3 is performed.

An embodiment of this application further provides a readable storage medium, where the readable storage medium stores a program or an instruction, and when the program or the instruction is executed by a processor, the processes of the method embodiments in FIG. 2 or FIG. 3 are implemented, and a same technical effect can be achieved. To avoid repetition, details are not described herein again.

The processor is a processor in the terminal in the foregoing embodiment. The readable storage medium includes a computer-readable storage medium, such as a computer read-only memory (Read-Only Memory, ROM), a random access memory (Random Access Memory, RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing method in FIG. 2 and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that in this specification, the term "include", "comprise", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed order, and may further include performing functions in a basically simultaneous manner or in a reverse order according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a computer software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A codebook feedbacking method, comprising:

when one type 3 codebook and other hybrid automatic repeat request acknowledgement (HARQ-ACK) codebook need to be fed back in a single time unit as triggered by a network side, determining, by a terminal, that a type of a target HARQ-ACK is the type 3 codebook based on a codebook determination method where only the type 3 codebook is transmitted; and when the type of the target HARQ-ACK is the type 3 codebook, determining, by the terminal, a target codebook to be fed back based on the type 3 codebook and the other HARQ-ACK codebook, wherein HARQ processes corresponding to the type 3 codebook cover all HARQ processes corresponding to the other HARQ-ACK codebook.

2. The method according to claim 1, wherein the type 3 codebook and the other HARQ-ACK codebook correspond to a same physical layer priority;

or one of the type 3 codebook and the other HARQ-ACK codebook corresponds to a different physical layer priority from that corresponding to a rest code.

3. The method according to claim 1, wherein a state corresponding to the type 3 codebook is comprised in a state list configured by the network side.

4. The method according to claim 1, wherein the type 3 codebook comprises: a basic type 3 codebook and/or an enhanced type 3 codebook.

5. The method according to claim 1, wherein the method further comprises:

determining, by the terminal, a physical layer priority corresponding to the target codebook; and feeding back, by the terminal, the target codebook according to a first codebook feedback method and the physical layer priority corresponding to the target codebook.

6. The method according to claim 5, wherein the first codebook feedback method comprises one of the following:

separately processing codebook(s) corresponding to each physical layer priority; and in a case that transmissions carrying codebooks corresponding to different physical layer priorities overlap in time domain, only feeding back the target codebook with a high physical layer priority;

allowing codebook multiplexing across physical layer priorities, or allowing simultaneous the transmission of the codebooks corresponding to the different physical layer priorities; and directly feeding back a basic type 3 codebook.

7. The method according to claim 6, wherein the allowing simultaneous transmission of HARQ-ACK codebooks with the different physical layer priorities comprises:

the terminal transmits a target codebook corresponding to a high physical layer priority and a target codebook corresponding to a low physical layer priority on a PUCCH respectively;

or the terminal transmits a target codebook corresponding to a high physical layer priority on a PUCCH, and the terminal transmits a target codebook corresponding to a low physical layer priority on a PUSCH;

or the terminal transmits a target codebook corresponding to a low physical layer priority on a PUCCH, and the terminal transmits a target codebook corresponding to a high physical layer priority on a PUSCH.

8. The method according to claim 6, wherein the allowing codebook multiplexing across the physical layer priorities comprises:

the terminal multiplexes target codebooks corresponding to different physical layer priorities, and carries the multiplexed codebook on a single PUCCH for transmission.

9. The method according to claim 1, wherein the method further comprises:

not expecting, by the terminal, the network side to trigger the terminal to feed back multiple type 3 codebooks in a single time unit.

10. A feedback codebook method, comprising:

triggering, by a network side device, a terminal to feedback one type 3 codebook and other hybrid automatic repeat request acknowledgement (HARQ-ACK) codebook in a single time unit; and obtaining, by the network side device, a target codebook fed back by the terminal, wherein a type of the target codebook is the type 3 codebook, wherein HARQ processes corresponding to the type 3 codebook cover all HARQ processes corresponding to the other HARQ-ACK codebook.

11. The method according to claim 10, wherein the type 3 codebook and the other HARQ-ACK codebook correspond to a same physical layer priority;

or one of the type 3 codebook and the other HARQ-ACK codebook corresponds to a different physical layer priority from that of other codebook.

12. The method according to claim 10, wherein the method further comprises:

determining, by the network side device, that a number of type 3 codebooks fed back by the terminal in a single time unit is one.

13. A network side device, comprising a processor, a memory, and a program stored in the memory and executable on the processor, wherein when the program is executed by the processor, the steps of the method according to claim 10 are implemented.

14. A terminal, comprising a processor, a memory, and a program stored in the memory and executable on the processor, wherein the program, when executed by the processor, implements the following steps:

when type 3 codebook and other hybrid automatic repeat request acknowledgement (HARQ-ACK) codebook need to be fed in a single time unit as triggered by a network side, determining, that a type of a target HARQ-ACK is the type 3 codebook based on a codebook determination method where only the type 3 codebook is transmitted; and when the type of the target HARQ-ACK is the type 3 codebook, determining a target codebook to be fed back based on the type 3 codebook and the other HARQ-ACK codebook, wherein HARQ processes corresponding to the type 3 codebook cover all HARQ processes corresponding to the other HARQ-ACK codebook.

* * * * *